US010809861B2

(12) United States Patent
Kim et al.

(10) Patent No.: US 10,809,861 B2
(45) Date of Patent: Oct. 20, 2020

(54) ELECTRONIC DEVICE INCLUDING TOUCH SENSOR-BONDING STRUCTURE

(71) Applicant: SAMSUNG ELECTRONICS CO., LTD., Suwon-si, Gyeonggi-do (KR)

(72) Inventors: Jinman Kim, Suwon-si (KR); Yongwon Lee, Suwon-si (KR); Seyoung Jang, Suwon-si (KR); Kwangho Shin, Suwon-si (KR); Bongjae Rhee, Suwon-si (KR); Juhee Han, Suwon-si (KR); Hyunsuk Choi, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/381,248

(22) Filed: Apr. 11, 2019

(65) Prior Publication Data

US 2019/0317627 A1 Oct. 17, 2019

(30) Foreign Application Priority Data

Apr. 12, 2018 (KR) ........................ 10-2018-0042721

(51) Int. Cl.
*G06F 3/045* (2006.01)
*G06F 3/041* (2006.01)
*G06F 3/046* (2006.01)
*G06K 9/00* (2006.01)

(52) U.S. Cl.
CPC .............. *G06F 3/045* (2013.01); *G06F 3/046* (2013.01); *G06F 3/04146* (2019.05); *G06F 3/04164* (2019.05); *G06F 2203/04107* (2013.01); *G06K 9/00006* (2013.01)

(58) Field of Classification Search
None
See application file for complete search history.

(56) References Cited

U.S. PATENT DOCUMENTS

| 2013/0076485 A1 | 3/2013 | Mullins |
| 2015/0036065 A1 | 2/2015 | Yousefpor et al. |
| 2018/0012057 A1 | 1/2018 | Cho et al. |

FOREIGN PATENT DOCUMENTS

| KR | 10-2017-0119623 | 10/2017 |
| KR | 10-2017-0125455 | 11/2017 |
| WO | 2014/197333 | 12/2014 |
| WO | 2018/026135 | 2/2018 |

OTHER PUBLICATIONS

Search Report and Written Opinion dated Jul. 23, 2019 in counterpart International Patent Application No. PCT/KR2019/004366.

*Primary Examiner* — Aneeta Yodichkas
(74) *Attorney, Agent, or Firm* — Nixon & Vanderhye, P.C.

(57) ABSTRACT

Disclosed is an electronic device that includes: a housing including a first plate facing a first direction and a second plate facing a direction opposite the first direction; a display layer disposed between the first and second plates; and a touch detection layer disposed between the display layer and the second plate, wherein the touch detection layer may include: a first layer including a first face facing the display layer, a second face facing a direction away from the first face, and an opening; a second layer disposed between the opening and the second plate, electrically connected to the first layer, and being coupled to the first layer; and a fingerprint sensor disposed in the opening and disposed between the first layer and the second layer.

20 Claims, 33 Drawing Sheets

ELECTRONIC DEVICE INCLUDING TOUCH SENSOR-BONDING STRUCTURE

CROSS-REFERENCE TO RELATED APPLICATION

This application is based on and claims priority under 35 U.S.C. § 119 to Korean Patent Application No. 10-2018-0042721, filed on Apr. 12, 2018, in the Korean Intellectual Property Office, the disclosure of which is incorporated by reference herein in its entirety.

BACKGROUND

1) Field

The disclosure relates to a touch sensor bonding structure of an electronic device.

2) Description of Related Art

An electronic device may include at least one display and at least one input button (e.g., a home button). The input button may include a biometric sensor (e.g., a fingerprint sensor) configured to recognize a user's biometric information (e.g., fingerprint information) in a portion thereof. Sensors have a structure in which a sensing area to be sensed is exposed to the outside, and may use various schemes such as an ultrasonic scheme, a cap scheme, and an optical scheme.

In the in-display structure of a sensor of an electronic device, when the fingerprint sensor is mounted on the lower portion of the display panel, a lamination portion located above a fingerprint sensor may require a structure that minimizes the lamination portion in order to reduce acoustic impedance reduction and modulus difference. In an electronic device further including an EMR sensor (e.g., a digitizer) panel for the structure for minimization, a region of the EMR sensor (e.g., digitizer) panel is provided with an opening, and the fingerprint sensor is mounted in the state of being attached to a display through the opening.

However, since a pattern loop of an electromagnetic induction panel layer cannot be formed in an opening of the fingerprint sensor, stylus drawing may be disconnected or distorted, resulting in a linearity problem in which accurate input and drawing cannot be performed.

The above information is presented as background information only to assist with an understanding of the present disclosure. No determination has been made, and no assertion is made, as to whether any of the above might be applicable as prior art with regard to the present disclosure.

SUMMARY

According to various embodiments of the disclosure, an electronic device is provided that is capable of providing a sensor bonding structure in order to suppress a pattern loop discontinuous-section problem in an electromagnetic induction panel in an electronic device in which a fingerprint sensor is mounted with an in-display-type sensor.

An electronic device according to various embodiments may include: a housing including a first plate facing a first direction and a second plate facing a direction opposite the first direction; a display layer disposed between the first and second plates; and a touch detection layer disposed between the display layer and the second plate, wherein the touch detection layer may include: a first layer including a first face facing the display layer, a second face facing a direction away from the first face, and an opening; a second layer disposed between the opening and the second plate, electrically connected to the first layer, and being coupled to the first layer; and a fingerprint sensor disposed in the opening and disposed between the first layer and the second layer.

An electronic device according to various embodiments may include: a first digitizer including a plurality of first conductive lines and an opening formed by removing at least a portion of the plurality of first conductive lines; a second digitizer including a plurality of second conductive lines and covering at least a portion of the opening, the second digitizer being disposed to overlap at least a portion of the first digitizer and bonded to at least a portion of the first digitizer, and the second digitizer being configured to electrically connect respective first conductive lines spaced apart from each other by the opening; and a fingerprint sensor disposed in the opening and disposed between the first and second digitizers.

An electronic device according to various embodiments is capable of maintaining normal pen linearity by suppressing a pattern loop discontinuous-section problem in an electromagnetic induction panel.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
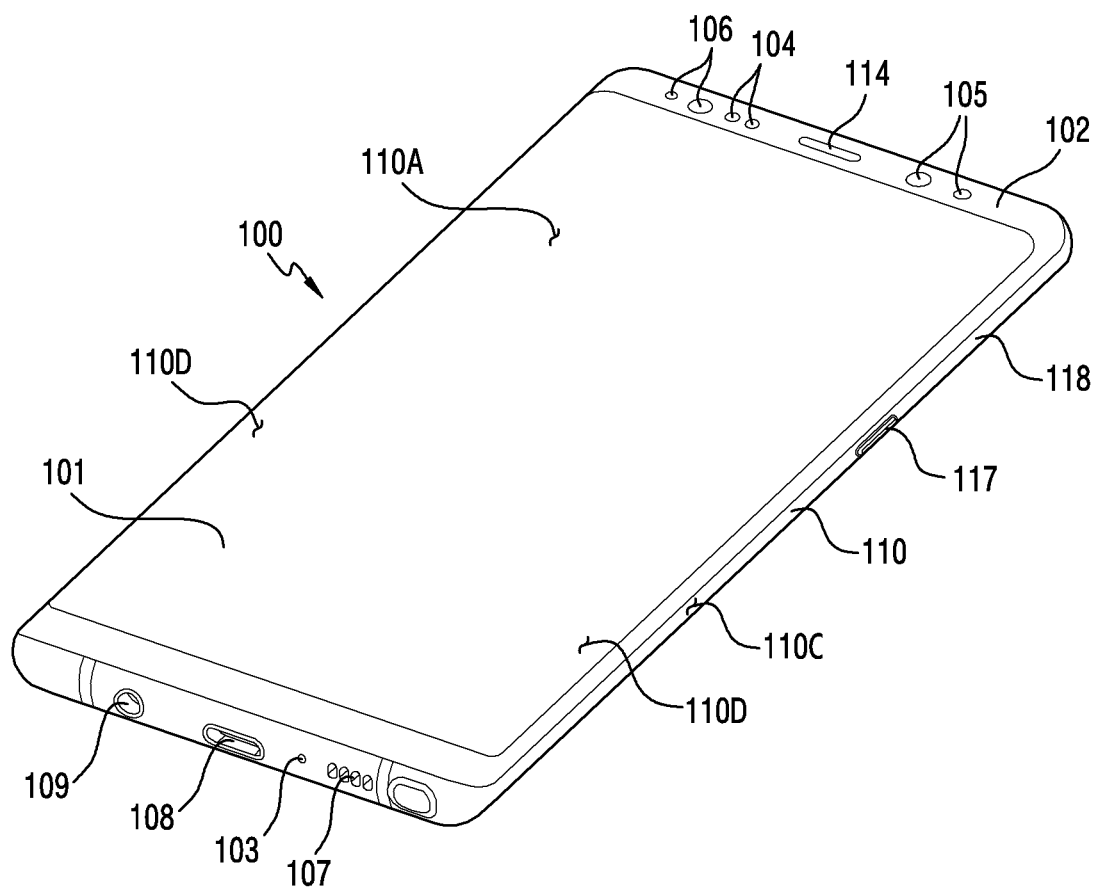
FIG. 1 is a perspective view illustrating the front face of an example mobile electronic device according to various embodiments.

Hereinafter, various example embodiments of the present disclosure will be described with reference to accompanying drawings. However, the various example embodiments of the present disclosure are not limited to specific embodiments, and it should be understood that various modifications, equivalents, and/or alternatives on the various embodiments described herein can be variously made. With regard to description of drawings, similar components may be marked by similar reference numerals.

An electronic device according to various embodiments of the present disclosure may include, for example, and without limitation, at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (for example, smart glasses, head-mounted-devices (HMDs), electronic apparels, electronic bracelets, electronic necklaces, electronic appcessory, electronic tattoos, smart mirrors, smart watches, or the like), or the like.

According to certain embodiments, the electronic devices may include, for example, smart home appliances. The smart home appliances may include, for example, and without limitation, at least one of, televisions (TVs), digital video disk (DVD) players, audios, refrigerators, air conditioners, cleaners, ovens, microwave ovens, washing machines, air cleaners, set-top boxes, home automation control panels, security control panels, TV boxes (for example, Samsung HomeSync™, Apple TV™, or Google TV™), game consoles (for example, Xbox™ and PlayStation™), electronic dictionaries, electronic keys, camcorders, electronic picture frames, and the like.

According to another embodiment, the electronic devices may include, for example, and without limitation, at least one of medical devices (for example, various portable medical measurement devices (for example, a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation electronic devices, global positioning system receivers (GPSs), event data recorders (EDRs), flight data recorders (FDRs), vehicle infotainment devices, electronic equipment for vessels (for example, navigation systems and gyrocompasses), avionics, security devices, head units for vehicles, industrial or home robots, automatic teller's machines (ATMs) of financial institutions, points of sales (POSs) of stores, internet of things (for example, light bulbs, various sensors, electric or gas meters, sprinkler devices, fire alarms, thermostats, street lamps, toasters, exercise equipment, hot water tanks, heaters, boilers, and the like), or the like.

According to an example embodiment, the electronic devices may include, for example, and without limitation, at least one of a part of furniture or buildings/structures, electronic boards, electronic signature receiving devices, projectors, various measuring instruments (for example, water meters, electricity meters, gas meters, or wave meters, and the like), or the like. The electronic devices according to various embodiments may be one or more combinations of the above-mentioned devices. According to an example embodiment, an electronic device may be a flexible electronic device. Also, electronic devices according to various embodiments of the present disclosure are not limited to the above-mentioned devices, and may include new electronic devices according to technology development.

Figure 2:
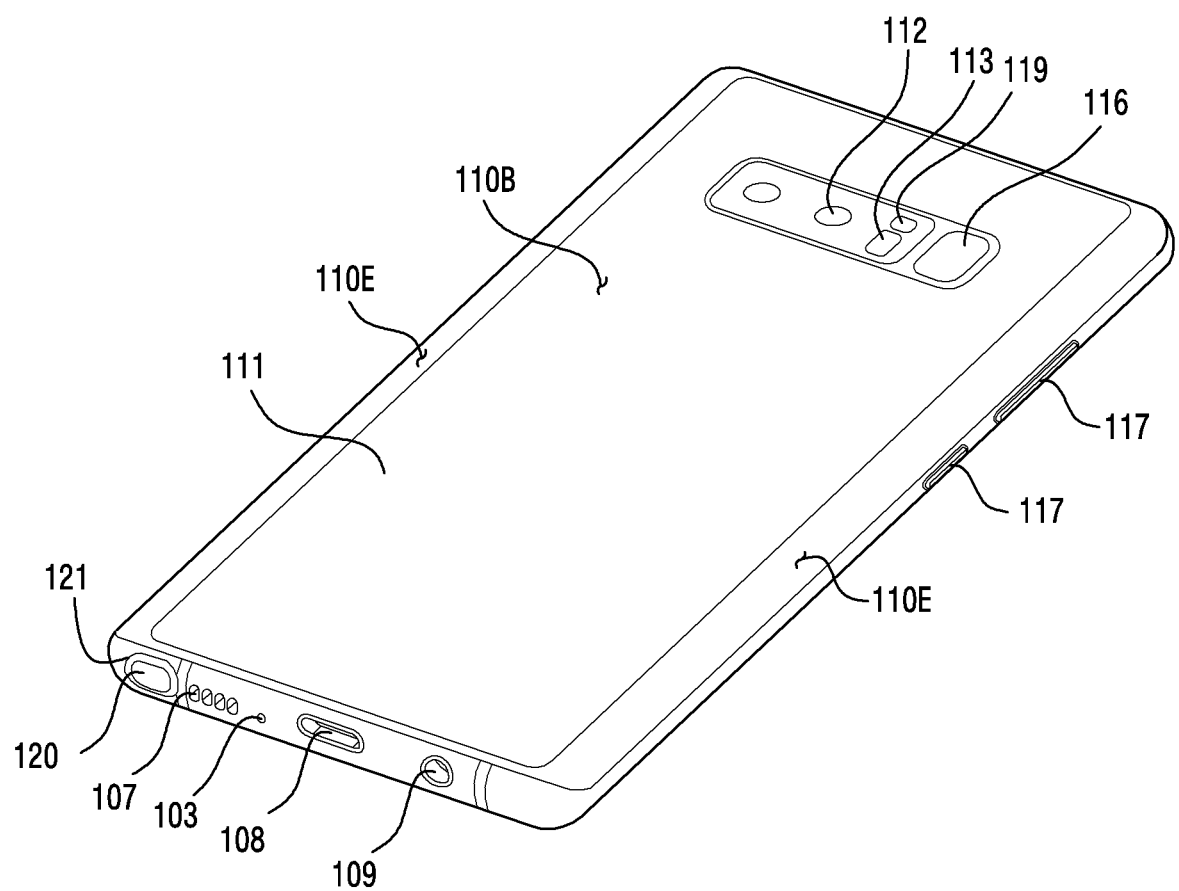
FIG. 2 is a perspective view illustrating the rear face of the electronic device of FIG. 1 according to various embodiments.

FIG. 1 is a perspective view illustrating the front face of an example mobile electronic device according to various embodiments. FIG. 2 is a perspective view illustrating the rear face of the example electronic device of FIG. 1 according to various embodiments.

Referring to FIGS. 1 and 2, an electronic device 100 according to an embodiment may include: a housing 110 including a first face (or a front face) 110A, a second face (or a rear face) 110B, and a side face 110C surrounding a space between the first face 110A and the second face 110B. In another embodiment (not illustrated), the term, housing, may refer, for example, to a structure forming some of the first face 110A, the second face 110B, and the side face 110C of FIG. 1. According to an embodiment, at least a portion of the first face 110A may be formed by a substantially transparent front plate 102 (e.g., a glass plate or a polymer plate including various coating layers). The second face 110B may be formed by a substantially opaque rear plate 111. The rear plate 111 may be formed of, for example, coated or colored glass, ceramic, polymer, metal (e.g., aluminum, stainless steel (STS), or magnesium), or any combination thereof. The side face 110C may be formed by a side bezel structure (or a "side member") 118 coupled to the front plate 102 and the rear plate 111 and including a metal and/or a polymer. In some embodiments, the rear plate 111 and the side bezel structure 118 may be integrally formed, and may include the same material (e.g., a metal material such as aluminum).

In the illustrated embodiment, the front plate 102 may include two first regions 110D, which are bent from the first face 110A toward the rear plate 111 and extend seamlessly, at the long opposite side edges thereof. In the illustrated embodiment (see FIG. 2), the rear plate 111 may include two second regions 110E, which are bent from the second face 110B toward the front plate 102 and extend seamlessly, at the long opposite side edges thereof. In some embodiments, the front plate 102 (or the rear plate 111) may include only one of the first regions 110D (or the second regions 110E). In another embodiment, some of the first regions 110D and the second regions 110E may not be included. In the above embodiments, when viewed from a side of the electronic device 100, the side bezel structure 118 may have a first thickness (or width) on a side face where the first regions 110D or the second regions 110E are not included, and may have a second thickness (or width), which is thinner than the first thickness, on a side where the first regions 110D or the second regions 110E are included.

According to an embodiment, the electronic device 100 may include one or more of a display 101, audio modules 103, 107, and 114, sensor modules 104, 116, and 119, camera modules 105 and 112, key input devices 117, a light-emitting element 106, a pen input device 120, and connector holes 108, 109. In some embodiments, in the electronic device 100, at least one of the components ((e.g., the key input devices 117 or the light-emitting element 116) may be omitted, or other components may be additionally included.

The display 101 may be exposed through a substantial portion of the front plate 102, for example. In some embodiments, at least a portion of the display 101 may be exposed through the front plate 102 forming the first face 110A and the first regions 110D of the side faces 110C. In some embodiments, the edges of the display 101 may be formed to be substantially the same as the adjacent contours of the front plate 102. In another embodiment (not illustrated), the distance between the outer contour of the display 101 and the outer contour of the front plate 102 may be substantially constant in order to enlarge the exposed area of the display 101.

In another embodiment (not illustrated), a recess or an opening is disposed in a portion of a screen display region of the display 101, and at least one of an audio module 114, a sensor module 104, a camera module 105, and a light-emitting element 106 may be aligned with the recess or the opening. In another embodiment (not illustrated), a rear face of the screen display region of the display 101 may include at least one of an audio module 114, a sensor module 104, a camera module 105, a fingerprint sensor 116, and a light-emitting element 106. In another embodiment (not illustrated), the display 101 may be coupled to or disposed adjacent to a touch-sensing circuit, a pressure sensor capable of measuring the intensity of the touch (pressure), and/or a digitizer that detects a stylus pen. In some embodiments, at least some of the sensor modules 104 and 119 and/or at least some of the key input devices 117 may be disposed in the first regions 110D and/or the second regions 110E.

The audio modules 103, 107, and 114 may include a microphone hole 103 and speaker holes 107 and 114. The microphone hole 103 may include a microphone disposed therein to acquire external sound, and in some embodiments, a plurality of microphones disposed therein to sense the direction of sound. The speaker holes 107 and 114 may include an external speaker hole 107 and a phone call receiver hole 114. In some embodiments, the speaker holes 107 and 114 and the microphone hole 103 may be implemented as a single hole, or a speaker may be included without the speaker holes 107 and 114 (e.g., a piezo speaker).

The sensor modules 104, 116, and 119 may generate electrical signals and/or data values corresponding to an operating state inside the electronic device 100, or an external environmental condition. The sensor modules 104, 116, and 119 may include, for example, a first sensor module 104 (e.g., a proximity sensor) and/or a second sensor module (not illustrated) (e.g., a fingerprint sensor) disposed on the first face 110A of the housing 110, and/or a third sensor module 119 (e.g., an HRM sensor) and/or a fourth sensor module 116 (e.g., a fingerprint sensor) disposed on the second face 110B of the housing 110. The fingerprint sensor may be disposed not only on the first face 110A of the housing 110 (e.g., the display 101), but also on the second face 110B. The electronic device 100 may further include at least one of sensors (not illustrated) such as a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, and an illuminance sensor 104.

The camera modules 105 and 112 may include a first camera device 105 disposed on the first face 110A of the electronic device 100 and a second camera device 112 disposed on the second surface 110B, and/or a flash 113. The camera devices 105 and 112 may include one or more lenses, an image sensor, and/or an image signal processor. The flash 113 may include, for example, a light-emitting diode or a xenon lamp. In some embodiments, two or more lenses (e.g., an infrared camera lens, a wide-angle lens, and a telephoto lens) and image sensors may be disposed on one face of the electronic device 100.

The key input devices 117 may be disposed on the side surfaces 110C of the housing 110. In another embodiment, the electronic device 100 may not include some or all of the above-mentioned key input devices 117, and a non-included key input device 117 may be implemented in another form such as a soft key on the display 101. In some embodiments, the key input devices may include a sensor module 116 disposed on the second face 110B of the housing 110.

The light-emitting element 106 may be disposed on the first face 110A of the housing 110, for example. The light-emitting element 106 may provide, for example, status information of the electronic device 100 in an optical form. In another embodiment, the light-emitting element 106 may provide a light source that is interlocked with, for example, the operation of the camera module 105. The light-emitting element 106 may include, for example, and without limitation, an LED, an IR LED, a xenon lamp, or the like.

The connector holes 108 and 109 may include a first connector hole 108 capable of accommodating a connector (e.g., a USB connector) for transmitting and receiving power and/or data to and from an external electronic device, and/or a second connector hole 109 capable of receiving a connector (e.g., an earphone jack) for transmitting and receiving an audio signal to and from an external electronic device.

The pen input device 120 (e.g., a stylus pen) may be guided to be inserted into or detached from the inside of the housing 110 through a hole 121 formed in a side face of the housing 110, and may include a button for facilitating the detachment. The pen input device 120 may include a separate resonance circuit therein so as to be interlocked with an electromagnetic induction panel 390 (e.g., a digitizer) included in the electronic device 100. The pen input device 120 may include an ElectroMagnetic Resonance (EMR) scheme, an Active Electrical Stylus (AES) scheme, and an Electric-Coupled Resonance (ECR) scheme.

Figure 3:
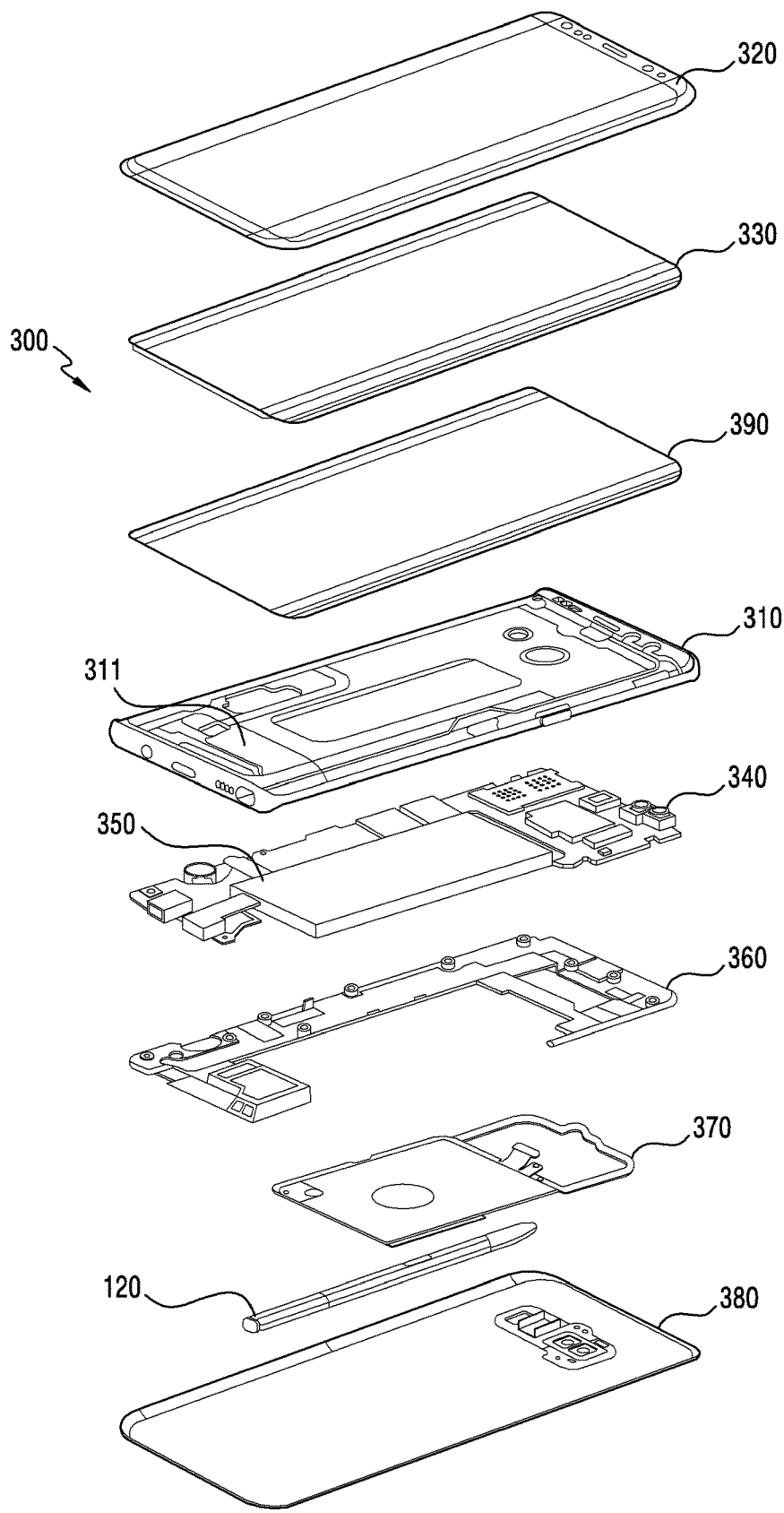
FIG. 3 is an exploded perspective view illustrating an example internal configuration of the electronic device of FIG. 1 according to various embodiments.

FIG. 3 is an exploded perspective view illustrating an example internal configuration of the electronic device of FIG. 1 according to various embodiments.

Referring to FIG. 3, the electronic device 300 may include a side bezel structure 310, a first support member 311 (e.g., a bracket), a front plate 320, a display 330, an electromagnetic induction panel 390, a printed circuit board 340, a battery 350, a second support member 360 (e.g., a rear case), an antenna 370, a pen input device 120, and a rear plate 380. In some embodiments, in the electronic device 300, at least one of the components (e.g., the first support member 311 or the second support member 360) may be omitted, or other components may be additionally included. At least one of the components of the electronic device 300 may be the same as or similar to at least one of the components of the electronic device 100 of FIG. 1 or 2, and a redundant description is omitted below.

The electromagnetic induction panel 390 (e.g., a digitizer) may be a panel configured to sense the input of the pen input device 120. For example, the electromagnetic induction panel 390 may include a printed circuit board (e.g., a Flexible Printed Circuit Board (FPCB)) and a shielding sheet. The shielding sheet is capable of preventing and/or reducing interference between the components due to electromagnetic fields generated from the components (e.g., the display module, the printed circuit board, the electromagnetic induction panel, etc.) included in the electronic device 100. By shielding the electromagnetic field generated from the components, the shielding sheet is capable of causing the input from the pen input device 120 to be accurately transferred to the coil included in the electromagnetic induction panel 240. The electromagnetic induction panel 240 according to various embodiments may include an opening formed in at least a region corresponding to the biometric sensor mounted on the electronic device 100.

The first support member 311 may be disposed inside the electronic device 300 and connected to the side bezel structure 310 or may be formed integrally with the side bezel structure 310. The first support member 311 may be formed of, for example, a metal material and/or a non-metal (e.g., polymer) material. A display 330 may be coupled to one side of the first support member 311, and a printed circuit board 340 may be coupled to the other side of the first support member 311. On the printed circuit board 340, a processor, a memory, and/or an interface, or the like, may be mounted, but the disclosure is not limited thereto. The processor may include, for example, and without limitation, one or more of a central processing unit, an application processor, a graphic processor, an image signal processor, a sensor hub processor, a communication processor, or the like.

The memory may include, for example, and without limitation, a volatile memory, a non-volatile memory, or the like.

The interface may include, for example, and without limitation, an HDMI, a USB interface, an SD card interface, and/or an audio interface, or the like. The interface may electrically or physically connect, for example, the electronic device 300 to an external electronic device, and may include a USB connector, an SD card/an MMC connector, or an audio connector.

The battery 350 may refer, for example, to a device for supplying power to at least one component of the electronic device 300 and may include, for example, and without limitation, a non-rechargeable primary battery, a rechargeable secondary battery, a fuel cell, or the like. At least a portion of the battery 350 may be disposed to be substantially flush with, for example, the printed circuit board 340. The battery 350 may be integrally disposed within the electronic device 300, or may be mounted to be detachable from the electronic device 300.

The antenna 370 may be disposed between the rear plate 380 and the display 350. The antenna 370 may include, for example, a Near Field Communication (NFC) antenna, a wireless charging antenna, and/or a Magnetic Secure Transmission (MST) antenna. The antenna 370 is capable of, for example, performing short-range communication with an external device or transmitting and receiving power required for charging in a wireless manner. In other embodiments, an antenna structure may be formed by the side bezel structure 310, a portion of the first support member 311, or a combination thereof.

Figure 4A:
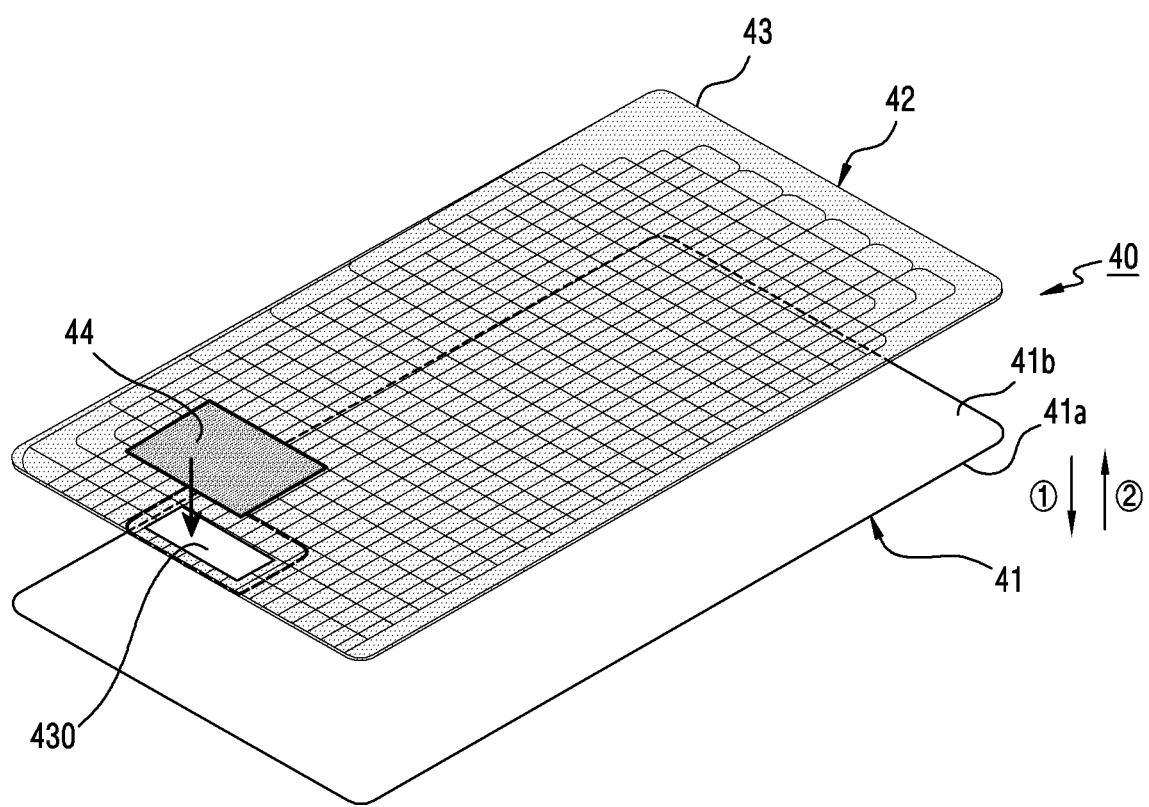
FIG. 4A is a perspective view illustrating an example state before first and second layers are bonded to each other according to various embodiments.
Figure 4B:
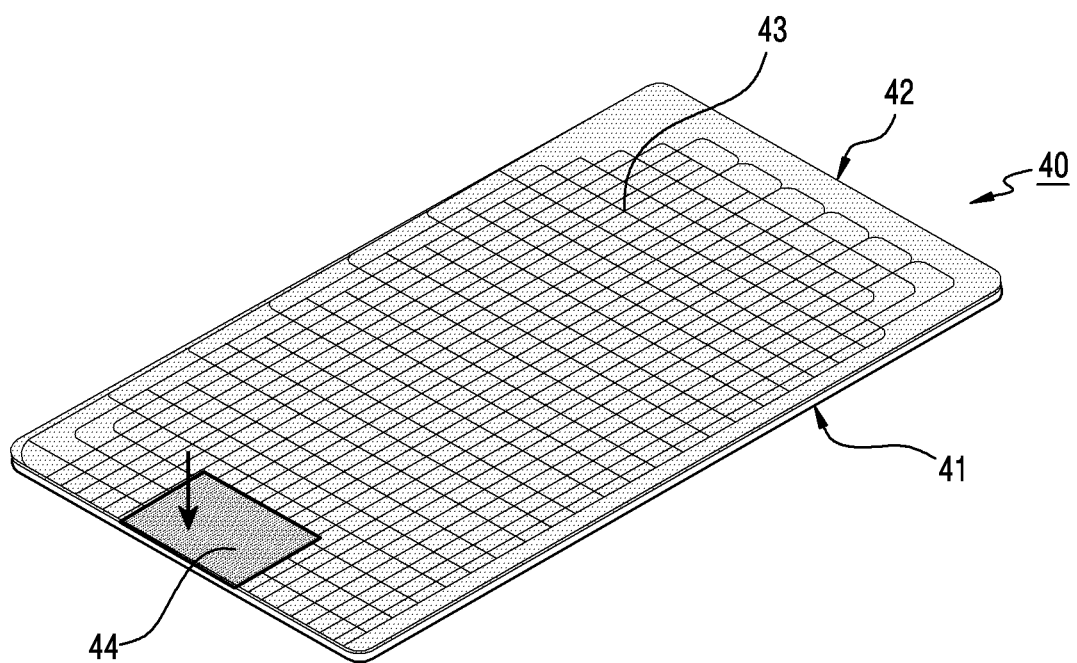
FIG. 4B is a perspective view illustrating an example state after the first and second layers are bonded to each other according to various embodiments.

FIG. 4A is a perspective view illustrating an example state before first and second layers are bonded to each other according to various embodiments. FIG. 4B is a perspective view illustrating an example state after the first and second layers are bonded to each other according to various embodiments.

Referring to FIGS. 4A and 4B, an electronic device 40 (e.g., the electronic device 100 illustrated in FIGS. 1 and 2 or the electronic device 300 illustrated in FIG. 3) may include a display layer 41 and a touch detection layer 42. The display layer 41 according to various embodiments may be located between the first plate of the electronics housing and the second plate facing away from the first plate. The touch detection layer 42 may be located between the display layer 41 and the second plate.

The display layer 41 according to various embodiments may include a first face 41a oriented in a first direction (the direction indicated by arrow ①) and a second face 41b oriented in a second direction (e.g., the direction opposite the first direction) (the direction indicated by arrow ②). For example, the display layer 41 may include a display made of a flexible material or a display made of a rigid material. The display layer 41 may have a flat shape, a curved shape having a predetermined curvature, or a combination thereof.

The touch detection layer 42 according to various embodiments may, for example, be an EMR sensor coupled to the second surface 41b of the display layer, and may include, for example, a digitizer. The touch detection layer 42 may include a first layer 43 and a second layer 44. At least a portion of the second layer 44 may be disposed to overlap at least a portion of the first layer 43 and bonded to the first layer 43 through a bonding process, such as a soldering process.

The first layer 43 according to various embodiments may include a first face 43a (see, e.g., FIG. 5) facing the display layer 41, a second face 43b (see, e.g., FIG. 5) facing away from the first face 41a, and an opening 430 formed through the first layer 43. For example, the first layer 43 may be an FPCB patterned with conductive lines and may include, for example, a first digitizer.

The second layer 44 according to various embodiments may be disposed between the opening 430 and the second plate and may be electrically connected to the first layer 43 while being coupled to the first layer 43. For example, the second layer 44 may include a second digitizer. It is impossible to form a pattern loop in the portion of the first layer where the opening 430 is present, but when the second layer 44 is coupled, it is possible to form the pattern loop.

The first layer 43 according to various embodiments may be applied with a first algorithm for linearity and malfunction prevention and/or reduction, and at least some of the regions adjacent to the opening 430, including the second layer 44, may be applied with a second algorithm for linearity and malfunction prevention and/or reduction.

Figure 5:
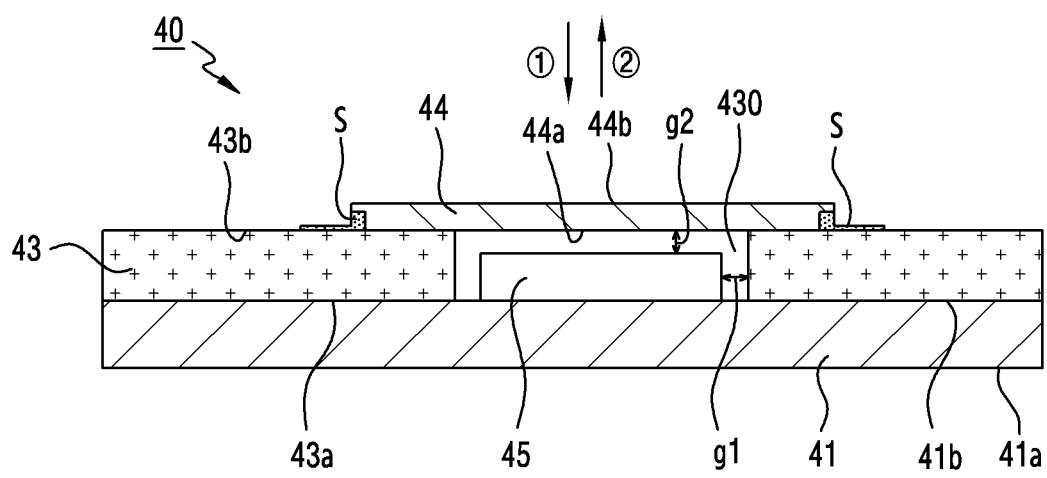
FIG. 5 is a cross-sectional view illustrating an example bonding structure of the first and second layers according to various embodiments.

FIG. 5 is a cross-sectional view illustrating a bonding structure of the first and second layers according to various embodiments.

Referring to FIG. 5, an electronic device 40 (e.g., the electronic device 40 of FIG. 4A) according to various embodiments may have a fingerprint sensor 45 fixedly accommodated in the opening 430 formed in the first layer 43. The display layer 41 includes a first face 41a oriented in a first direction and a second face 41b oriented in a second direction opposite the first direction, and the fingerprint sensor 45 may be attached to the second face 41b of the display layer 41. For example, the fingerprint sensor 45 may include a flexible circuit board of the fingerprint sensor (not illustrated) (e.g., a flexible circuit board 451 in FIG. 6), and the flexible circuit board of the fingerprint sensor may be drawn out of the opening 430.

The outer face of the fingerprint sensor 45 may be disposed such that a gap is interposed between the outer face and the first layer 43 and the second layer 44. The gap may include a side gap g1 and an upper surface gap g2. The side gap g1 may be a gap between the side face of the fingerprint sensor 45 and the first layer 43 and the upper face gap g2 may be a gap between the upper face of the fingerprint sensor 45 and the second layer 44.

The second layer 44 may be fixed on the first layer 43 in the state of at least partially overlapping the first layer 43 by a bonding structure S. The second layer 44 may have a size enough to cover the opening 430 and may provide a structure for allowing the flexible circuit board 451 (see, e.g., FIG. 6) of the fingerprint sensor to be drawn out of the opening 430. For example, a bonding process may proceed using a conductive bonding step. For example, the conductive bonding process may include, for example, and without limitation, a jet soldering process, a soldering process, an Anisotropic Conductive Film (ACF) attachment process, or the like. The second layer 44 may be fixed to the first layer 43 by the conductive bonding process. The reference symbol S may be solder.

When the second layer 44 is bonded to the first layer 43, the region to be bonded (overlapping region) may be the region around the opening 430 in the second face 43b of the first layer 43 and may be the peripheral regions of the first and second faces 44a and 44b of the second layer 44.

Figure 6:
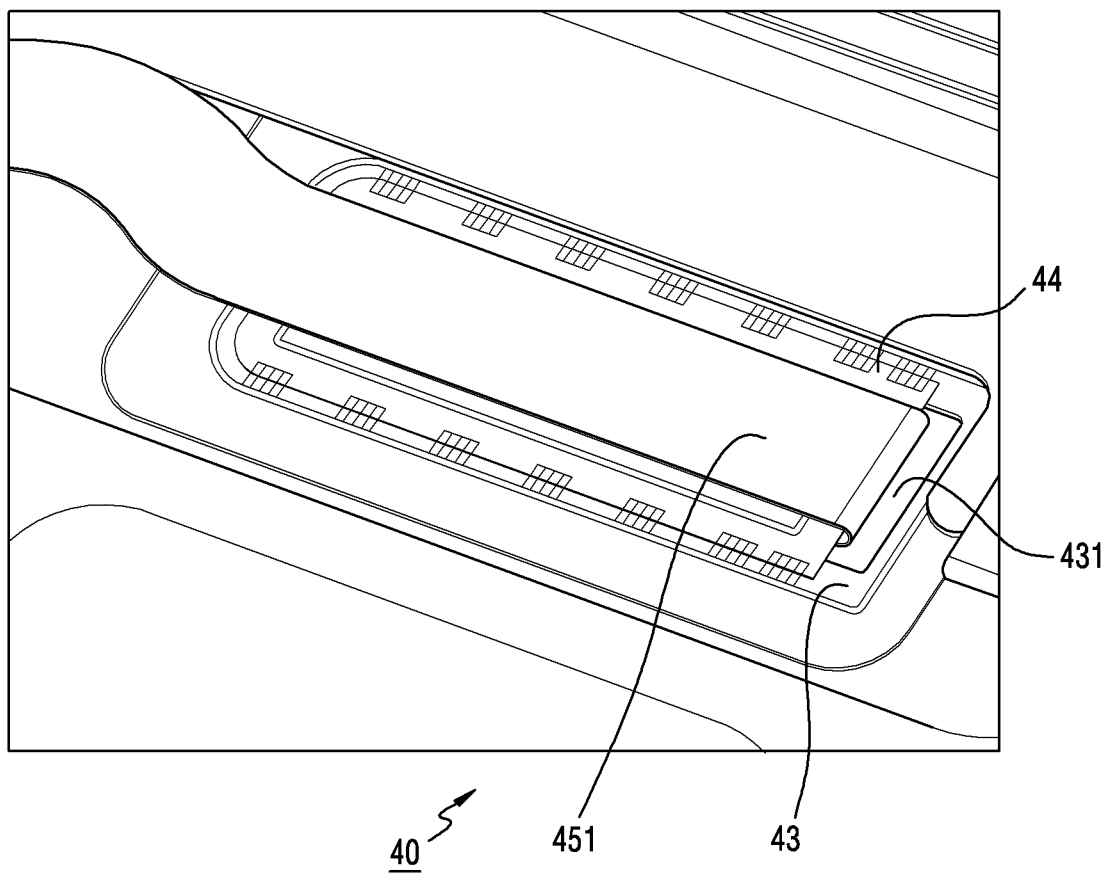
FIG. 6 is a perspective view illustrating an example slit provided in the bonding structure of the first and second layers according to various embodiments.

FIG. 6 is a perspective view illustrating an example slit provided in the bonding structure of the first and second layers according to various embodiments.

Referring to FIG. 6, an electronic device 40 (e.g., the electronic device 40 of FIG. 4A) according to various embodiments may include a slit 431 that allows the flexible circuit board 451 of the fingerprint sensor, which is located inside the opening 430, to be drawn out of the opening 430 after the fingerprint sensor is placed in opening 430. The fingerprint sensor may be electrically connected to the main printed circuit board by the flexible circuit board 451, and for this purpose, the slit 431 may be formed when the second layer 44 is bonded to the first layer 43. The slit 431 has an opening shape, and the flexible circuit board 451 may pass through the slit 431 when it is drawn out to the outside from the inside of the opening. The slit 431 may be located between the first layer 43 and the second layer 44.

Figure 7:
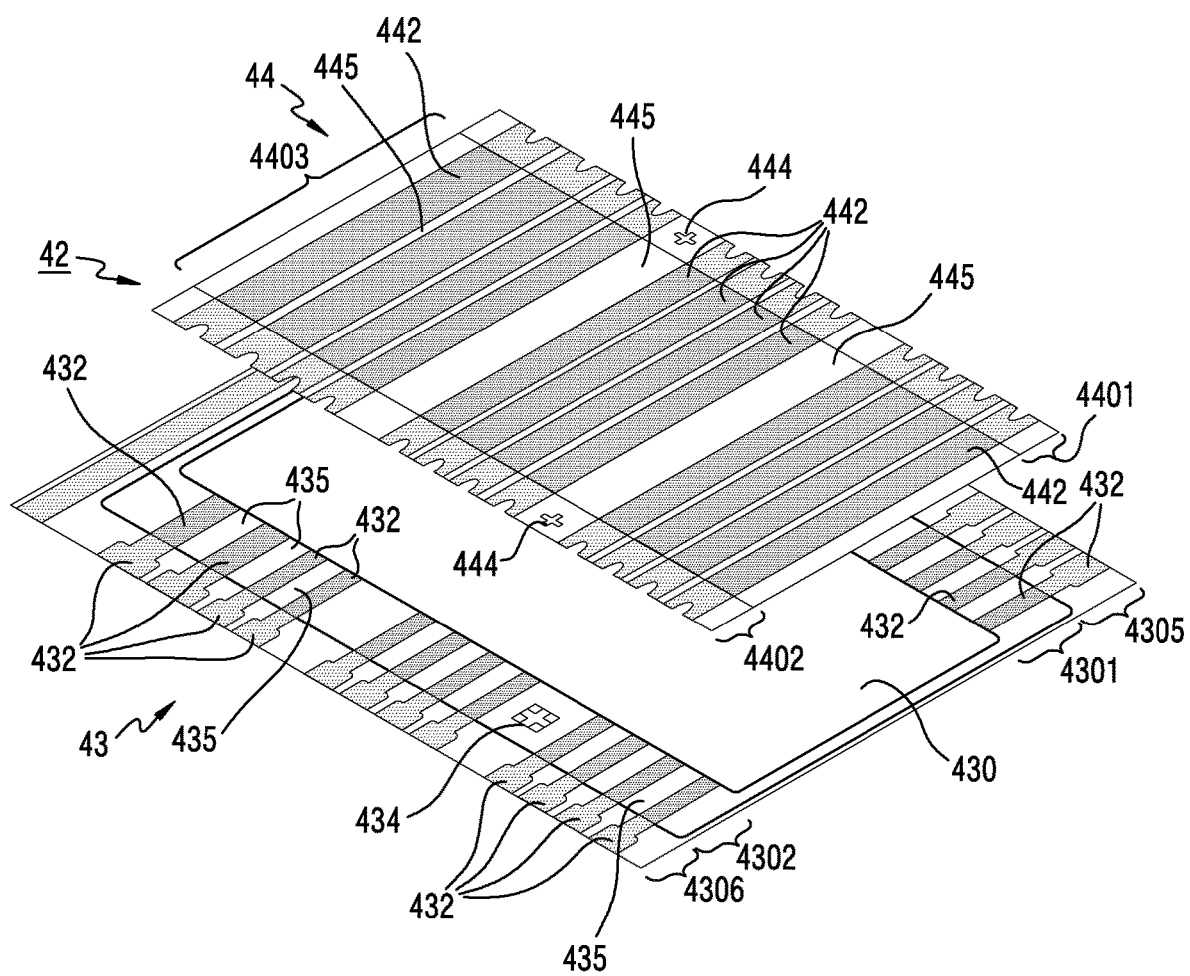
FIG. 7 is a perspective view illustrating an example state before first and second layers are bonded to each other according to various embodiments.

FIG. 7 is a perspective view illustrating an example state before first and second layers are bonded to each other according to various embodiments.

Referring to FIG. 7, a touch detection layer 42 (e.g., the touch detection layer 42 in FIG. 4A) according to various embodiments includes a bonding structure for electrically connecting the second layer 44 to the first layer 43.

The first layer 43 according to various embodiments may include one or more first conductive lines 432. The one or more first conductive lines 432 (e.g., four conductive lines) may form one channel, and may be arranged in one or more channels. A first non-conductive line 435 may be located between each adjacent first conductive lines 432. The second layer 44 according to various embodiments may include one or more second conductive lines 442. The one or more second conductive lines 442 (e.g., four conductive lines) may form one channel, and may be arranged in one or more channels. A second non-conductive line 445 may be located between each adjacent second conductive lines 442.

The bonding structure according to various embodiments may include first bonding regions 4301 and 4302 and first non-bonding regions 4305 and 4306 formed in the first layer 43 and second bonding region 4401 and 4402 and a second non-bonding region 4403 formed in the second layer 44. In the bonding structure, the first and second bonding regions 4301 and 4302; 4401 and 4402 are electrically and physically connected to each other by disposing the first and second connecting regions 4301 and 4302; 4401 and 4402 in an overlapping state and then performing a conductive bonding process (e.g., soldering). When the second layer 44 is fixed to the first layer 43 by the bonding structure, each first conductive line 432 is capable of being electrically connected to each second conductive line 442.

The respective first connection regions 4301 and 4302 may be formed around the opening 430 of the second face of the first layer 43, and the second connection regions 4401 and 4402 may formed at opposite end portions of the first face of the second layer 44. For example, in each of the first connection regions 4301 and 4302, the opposite end portions of the plurality of first conductive lines 432 and first non-conductive lines 435 are arranged, and in each of the second connection regions 4401 and 4402, the opposite end portions of the plurality of second conductive lines 442 and second non-conductive lines 445.

The touch detection layer 42 according to various embodiments may include a structure for aligning the first layer 43 and the second layer 44 in the process of connecting the second layer 44 to the first layer 43. For example, the first layer 43 may include at least one first alignment mark 434 and the second layer 44 may include at least one second alignment mark 444. When the first and second alignment marks 434 and 444 are aligned with each other, the bonding positions of the first and second layers 43 and 44 can be determined.

The at least one first alignment mark 434 may be located in a portion of the first connection regions 4301 and 4302, and may be located in the ends of the first non-conductive lines 435, which are located in the first connection regions 4301 and 4302. The at least one second alignment mark 444 may be located in a portion of the second connection regions 4401 and 4402, and may be located in the ends of the second non-conductive lines 445, which are located in the second connection regions 4401 and 4402. For example, each of the first and second alignment marks 434 and 444 may include a cross shape.

Figure 8A:
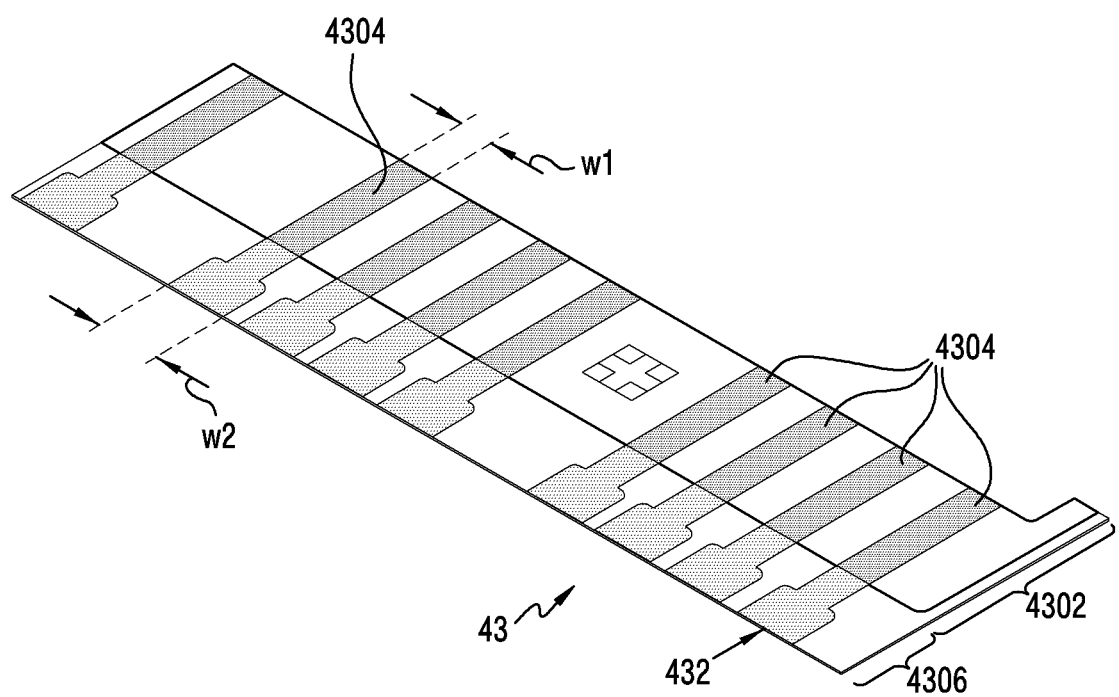
FIG. 8A is a perspective view illustrating a portion of an example bonding region of the first layer in an enlarged scale according to various embodiments.

FIG. 8A is a perspective view illustrating a portion of an example bonding region of the first layer in an enlarged scale according to various embodiments.

Referring to FIG. 8A, the first layer 43 (e.g., the first layer 43 of FIG. 4A) according to various embodiments may include first connection portions 4304 having a width. Each first connection portion 4304 may refer to a portion of a first conductive line 432 in the first connection region 4302.

The first connection portions 4304 may be included in a subset of a plurality of first conductive lines 432 of the first layer 43. A protective layer is removed from each of the first connection portions 4304, so that the wiring layer of respective first conductive lines 432, which are made of a conductive material, may be exposed.

Each of the first conductive lines 432 according to various embodiments may be configured to have different widths in a second layer and a first connection region 4302 (a region where the protective layer is removed or an overlapping region), and a first non-connection region 4306 (a region where the protective layer is not removed or an overlapping region). For example, each first conductive line 432 may have a first width w1 in the first connection region 4302 and a second width w2 in the first non-connection region. The second width w2 may be larger than the first width w1.

Figure 8B:
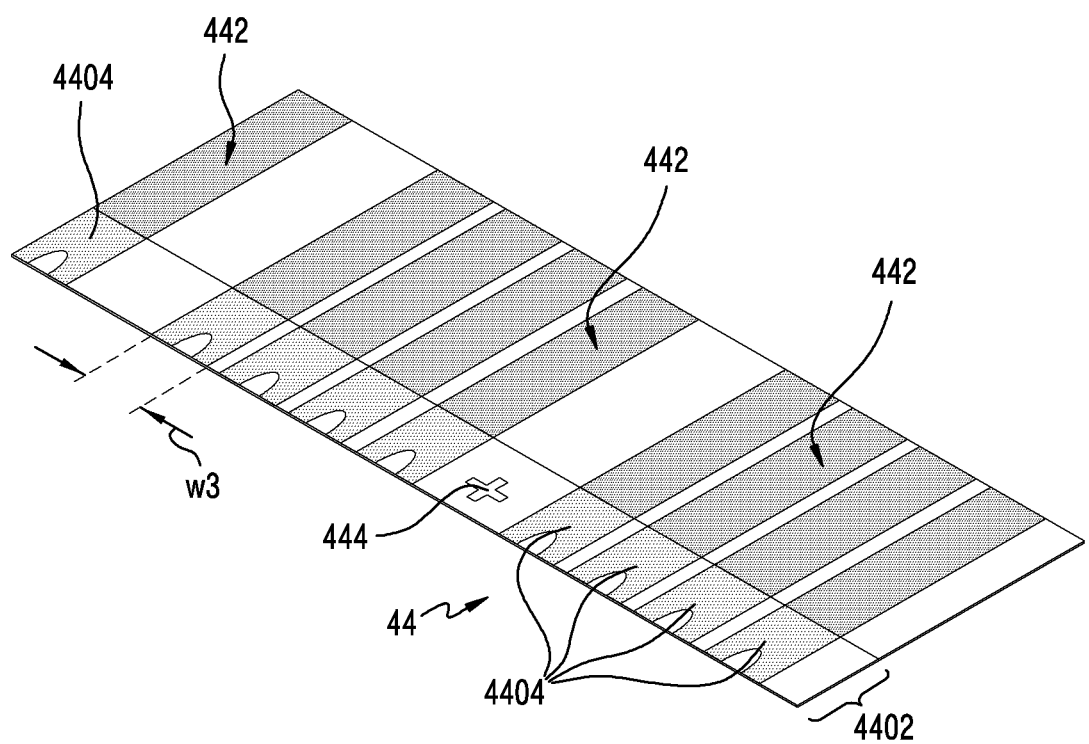
FIG. 8B is a perspective view illustrating a portion of an example bonding region of the second layer in an enlarged scale according to various embodiments.

FIG. 8B is a perspective view illustrating a portion of an example bonding region of the second layer in an enlarged scale according to various embodiments.

Referring to FIG. 8B, the second layer 44 (e.g., the second layer 44 of FIG. 4A) according to various embodiments may include second connection portions 4404 having a third width w3. The second connection portions 4404 may be included in a subset of a plurality of second conductive lines 442 of the second layer 44. Each second connection portion 4404 may refer to a portion of a second conductive line 442 in the second connection region 4402.

For example, a protective layer is removed from each of the second connection portions 4404, so that the wiring layer of second conductive lines 442, which are made of a conductive material, may be in the exposed state.

Figure 8C:
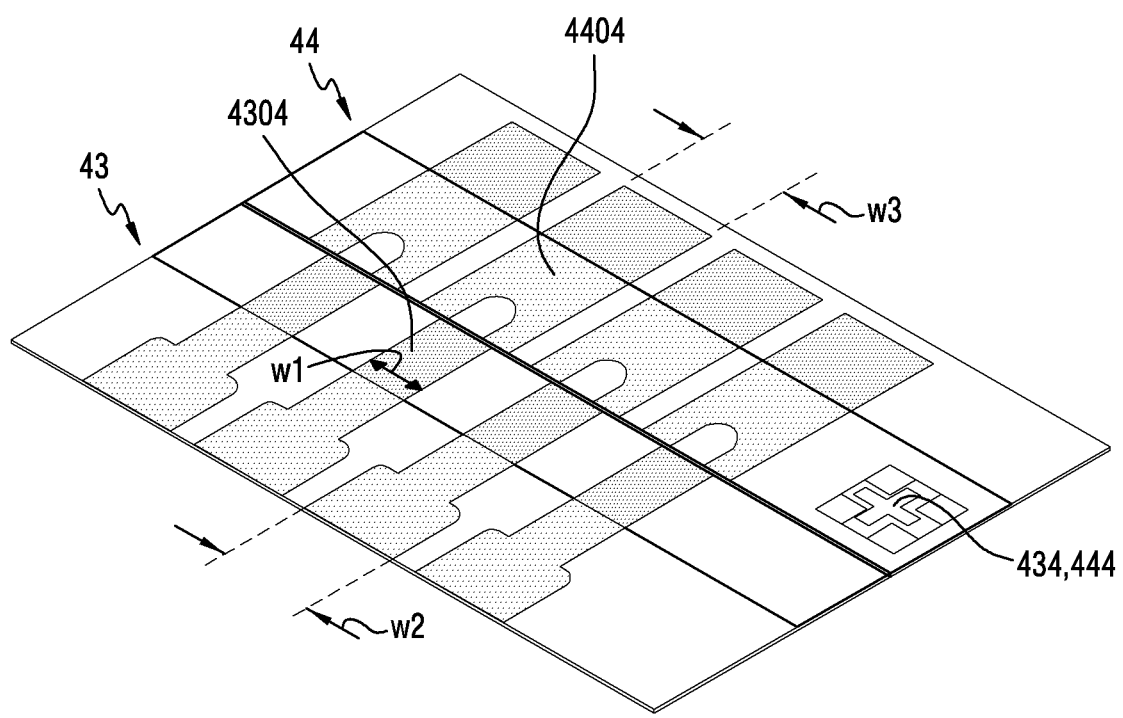
FIG. 8C is a perspective view illustrating a portion of an example bonding state of slightly tilted first and second layers in an enlarged scale according to various embodiments.

FIG. 8C is a perspective view illustrating a portion of an example bonding state of slightly tilted first and second layers in an enlarged scale according to various embodiments.

Referring to FIG. 8C, when bonding the first and second connection portions 4304 and 4404 according to various embodiments, the wiring layers of exposed first and second conductive lines may be electrically connected to each other by, for example, and without limitation, a jet soldering process, or the like, after an alignment operation.

The first width w1 of the first connection portions 4304 of the first layer 43 (e.g., the first layer 43 in FIG. 4A) and the third width w3 of the second connection portions 4404 of the second layer 44 (e.g., the second layer 44 in FIG. 4A) may be different from each other, and the third width w3 may be larger than the first width w1.

During the conductive bonding process (e.g., soldering) of the first and second layers 43 and 44, after the first and second alignment marks 434 and 444 are used to align the first and second layers 43 and 44, an alignment pass or a slight tilt may occur due to a process error. When the first and third widths w1 and w3 are set to be equal to each other as the third width, the distance between the first and second conductive lines of the first and second layers 43 and 44 is reduced, which may result in an increase in short circuit failure rate during the conductive bonding (e.g., soldering) process.

Therefore, the widths of the first and second conductive lines may be differently applied in the bonding region where the first layer 43 and the second layer 44 are bonded to each other. Because the size of the third width w3 is larger than the size of the first width w1, it is possible to minimize and/or reduce a short circuit failure rate between the conductive lines.

For example, the third width w3 cannot be made as small as the second width W2 due to the following reason: a conductive line needs to be designed to have a set impedance value or less for electromagnetic resonance induction and thus it is necessary to design the size of the third width W3 to be equal to or larger than a predetermined width.

Figure 9A:
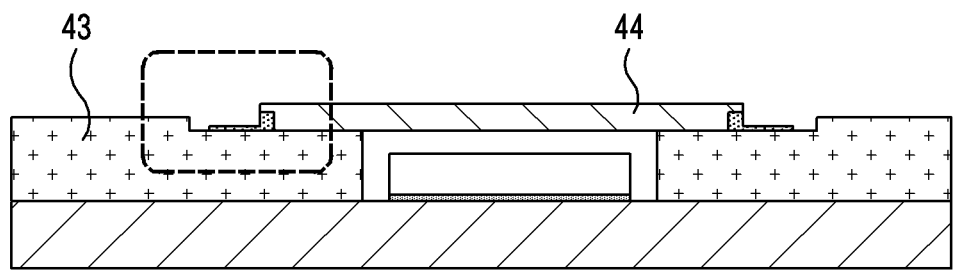
FIG. 9A is a cross-sectional view illustrating an example bonding structure of the first and second layers according to various embodiments.
Figure 9B:
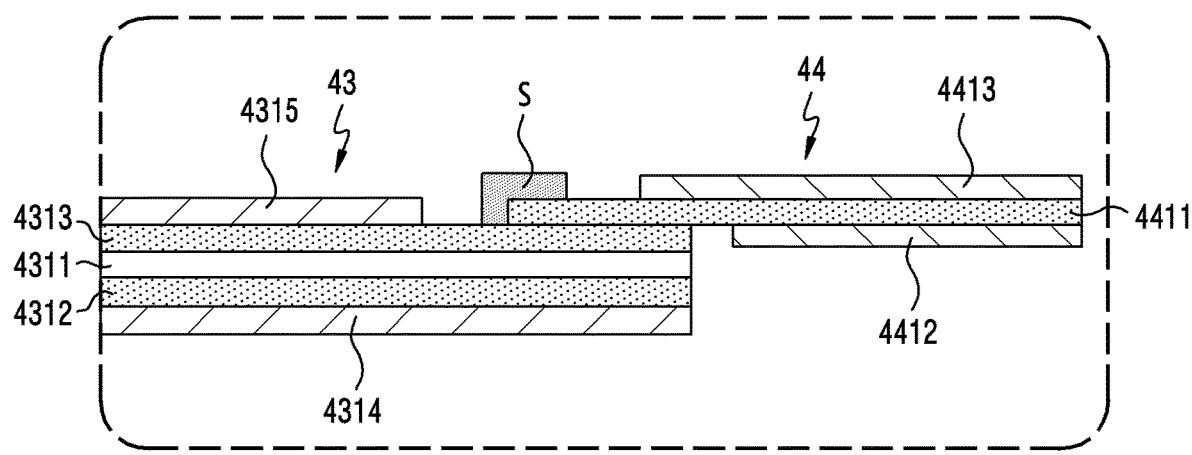
FIG. 9B is a diagram illustrating a part of FIG. 9A in an enlarged scale according to various embodiments.

FIG. 9A is a cross-sectional view illustrating an example bonding structure of the first and second layers according to various embodiments. FIG. 9B is a view illustrating a part of the example bonding structure of FIG. 9A in an enlarged scale according to various embodiments.

Referring to FIGS. 9A and 9B, a first layer 43 (e.g., the layer 43 in FIG. 4A) according to various embodiments may include a base layer 4311, first and second wiring layers 4312 and 4313, and first and second protective layers 4314 and 4315. Each of the first and second wiring layers 4312 and 4313 may include conductive lines of the first layer 43, and the first and second protective layers 4314 and 4315 may be formed of a non-conductive material on the first and second wiring layers 4312 and 4313 to form the first and second wiring layers 4312 and 4313, respectively. The first layer 43 may be patterned with a conductive material on the first and second faces of the base layer 4311, so that respective first and second conductive lines (e.g., the first and second conductive lines 432 and 442 in FIG. 7) can be formed. For example, and without limitation, the base layer 4311 may include polyimide, or the like.

The first layer 43 according to various embodiments may include a base layer 4311, a first wiring layer 4312 formed on the first face of the base layer 4311, a second wiring layer 4313 formed on the second face of the base layer 4311, a first protective layer 4314 formed on a first face of the first wiring layer 4312, and a second protective layer 4315 formed on a second face of the second wiring layer 4313.

The second layer 44 according to various embodiments may include a third wiring layer 4411 and third and fourth protective layers 4412 and 4413. The third wiring layer 4411 may include conductive lines, and each of the third and fourth protective layers 4412 and 4413 may be formed of a non-conductive material on the third wiring layer 4411 to protect the third wiring layer 4411. The second layer 44 according to various embodiments may include a third protective layer 4412 formed on a first face of the third wiring layer 4411 and a fourth protective layer 4413 formed on a second face of the third wiring layer 4411.

In the bonding structure of the first and second layers according to various embodiments, when at least a portion of the second protective layer 4315 is removed and at least a portion of the third protective layer is removed, at least a portion of the second wiring layer 4313 may be exposed and at least a portion of the third wiring layer 4411 may be exposed. After exposing the second and third wiring layers 4313 and 4411, at least a portion of the second wiring layer 4313 may be electrically connected to the third wiring layer 4411 through a conductive bonding (e.g., soldering) process. Removal of the second protective layer 4315 and the third protective layer 4412 may be performed through an etching process, for example. The reference symbol S may, for example, denote solder. Respective conductive lines of the second and third wiring layers 4313 and 4411 may be electrically connected to each other by the solder S.

Figure 10:
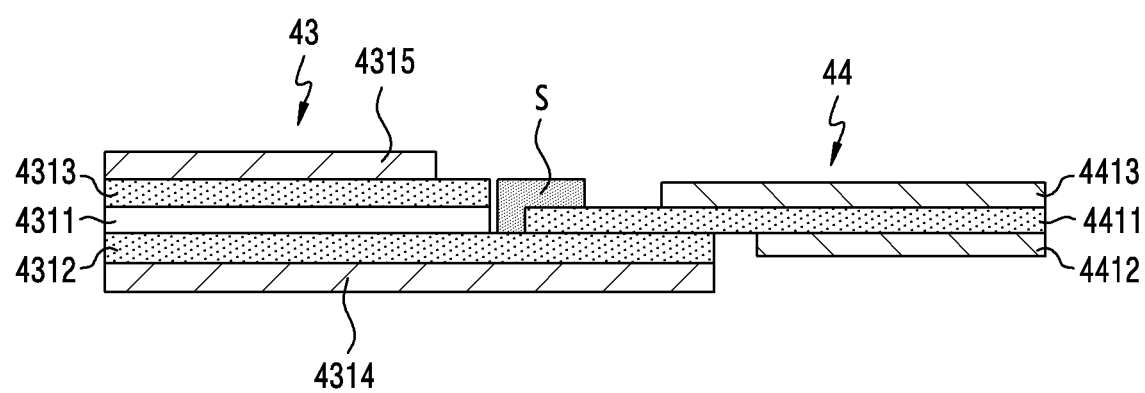
FIG. 10 is an enlarged cross-sectional view illustrating an example bonding structure of the first and second layers according to various embodiments.

FIG. 10 is an enlarged cross-sectional view illustrating an example bonding structure of the first and second layers according to various embodiments.

Referring to FIG. 10, in the bonding structure of first and second layers 43 and 44 (e.g., the first and second layers 43 and 44 in FIG. 4A) according to various embodiments, at least a portion of the first wiring layer 4312 may be electrically connected to the third wiring layer 4411 through a conductive bonding process by at least partially removing the second protective layer 4315, the second wiring layer 4313, and the base layer 4311 and removing a portion of the third protective layer 4412.

Removal of the second protective layer 4315, the second wiring layer 4313, the base layer 4311, and/or the third protective layer 4412 may be performed through, for example, and without limitation, an etching process, or the like. The reference symbol S may, for example, denote solder. Respective conductive lines of the first and third wiring layers 4312 and 4411 may be electrically connected to each other by the solder S.

Figure 11:
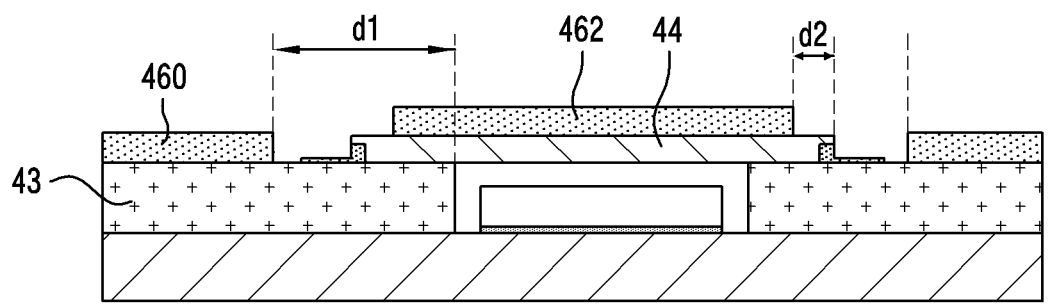
FIG. 11 is a cross-sectional view illustrating an example state in which first and second shield layers are disposed in the bonding structure of the first and second layers according to various embodiments.

FIG. 11 is a cross-sectional view illustrating an example state in which first and second shield layers are disposed in the bonding structure of the first and second layers according to various embodiments.

Referring to FIG. 11, an electronic device according to various embodiments may further include first and second magnetic force shield layers 460 and 462 (e.g., Magnetic Metal Powder (MMP) layers), which are respectively formed on first and second layers 43 and 44 to improve the reception sensitivity by reflecting/blocking generated electromagnetic signals. The first layer 43 according to various embodiments may further include the first magnetic force shield layer 460 on the second face, and the second layer 44 may further include the second magnetic force shield layer 462 on the second face. The first and second magnetic force shield layers 460 and 462 may have the same thickness or different thicknesses. For example, the thickness of the first magnetic force shield layer 460 may be greater than the thickness of the second magnetic force shield layer 462. This may be because the first magnetic force shield layer 460 is larger in size than the second magnetic force shield layer 462.

Figure 12:
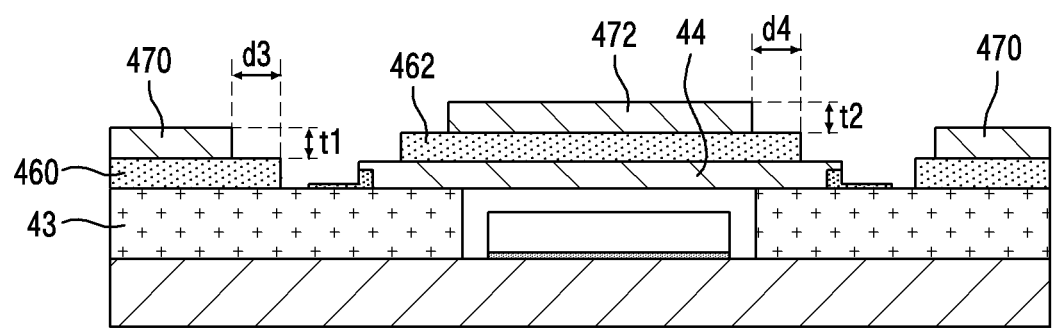
FIG. 12 is a cross-sectional view illustrating an example state in which first and second heat dissipation layers are disposed in the bonding structure of the first and second layers according to various embodiments.

FIG. 12 is a cross-sectional view illustrating an example state in which first and second heat dissipation layers are disposed in the bonding structure of the first and second layers according to various embodiments.

Referring to FIG. 12, an electronic device according to various embodiments may further include first and second heat dissipation layers, which are respectively formed on the first and second layers 43 and 44 (e.g., the first and second layers 43 and 44 in FIG. 4A), to transfer generated heat to a relatively low-temperature region. The first layer 43 according to various embodiments may include a first magnetic force shield layer 460 formed on a second face thereof and a first heat dissipation layer 470 formed on a second face of the first magnetic force shield layer 460. For example, the first heat dissipation layer 470 may include a heat dissipation sheet. The second layer 44 may include a second magnetic force shield layer 462 formed on a second face thereof and a first heat dissipation layer 472 formed on a second face of the second magnetic force shield layer 462. For example, the second heat dissipation layer 472 may include a heat dissipation sheet.

The thickness t1 of the first heat dissipation layer 470 according to various embodiments may be different from the thickness t2 of the second heat dissipation layer 472. For example, the first heat dissipation layer 470 may be thicker than the second heat dissipation layer 472. Since the first layer 43 is more associated with the direct performance of a digitizer when each of the first and second layers 43 and 44 is configured as a digitizer, the first heat dissipation layer 470 may be made thicker than the second heat dissipation layer 472.

In the bonding structure between the first and second layers according to various embodiments, the second heat dissipation layer 472 may require a rigid structure. An interlayer adhesive material for the second heat dissipation layer 472 may be different from an interlayer for the first heat dissipation layer 470. For example, the interlayer adhesive material for the second heat dissipation layer 472 may include an ultraviolet (UV)-curable material, and an additional process of curing the UV-curable adhesive material may be performed.

Referring to FIGS. 11 and 12, assuming that the distance between the opening sidewall of the first layer 43 and the side face of the first shield layer 460 is d1, the distance between the side face of the second layer 44 and the side face of the second shield layer 462 is d2, the distance between the side face of the first shield layer 460 and the side face of the first heat dissipation layer 470 is d3, and the distance between the side face of the second shield layer 462 and the side face of the second heat dissipation layer 472 is d4, d1 may equal to or larger than d3 and d2 may be equal to or larger than d4. According to this configuration, in the bonding structure of the first and second layers 43 and 44, the first and second layers 43 and 44 are laminated in a normal fault form, thereby improving inter-layer moisture entrance prevention performance, and improving the conductive bonding process (e.g., a soldering process).

The above-mentioned normal fault form may refer, for example, to a lamination structure in which the upper layer is narrower than the lower layer. For example, the lamination structure between the first and second layers 43 and 44, the lamination structure between the first layer 43 and the first shield layer 460, the lamination structure between the first shield layer 460 and the first heat dissipation layer 470, the lamination structure between the second layer 44 and the second shield layer 462, or the lamination structure between the second shield layer 462 and the second heat dissipation layer 472 is in the normal fault form and may be stable. The bonding structure between the first and second layers 43 and 44 is capable of minimizing and/or reducing the bonding failure during the conductive bonding process.

In addition, when an interlayer bonding structure is not in the normal fault form, for example, when an interlayer bonding structure is in a reverse fault form or an irregular fault form, pressure cannot be stably transferred during the bonding of respective layers, whereby a fine gap may occur at an edge thereof and moisture or the like may infiltrate through the gap. However, the bonding structure between the layers according to various embodiments may be laminated in the normal fault form so as to prevent inter-layer moisture entrance.

The rigid structure added to the second layer (e.g., the second layer 44 in FIG. 4A) according to various embodiments will now be described in greater detail below with reference to FIGS. 13 to 15.

The edge portions of the second layer 44 may be curved in the stamping process of the flexible circuit board, and the edge portions of the second layer 44 may be curved by being brought into contact with the sidewall of packing paper during product package.

Accordingly, the second layer 44, which may be made of a thin-film-type material and thus curved, is applied with a rigid structure, the curved degree of the second layer 44 is capable of being suppressed and/or minimized. According to the application of the rigid structure of the second layer 44, the bonding position may be improved in the process of bonding the second layer 44 with the first layer 43.

Figure 13:
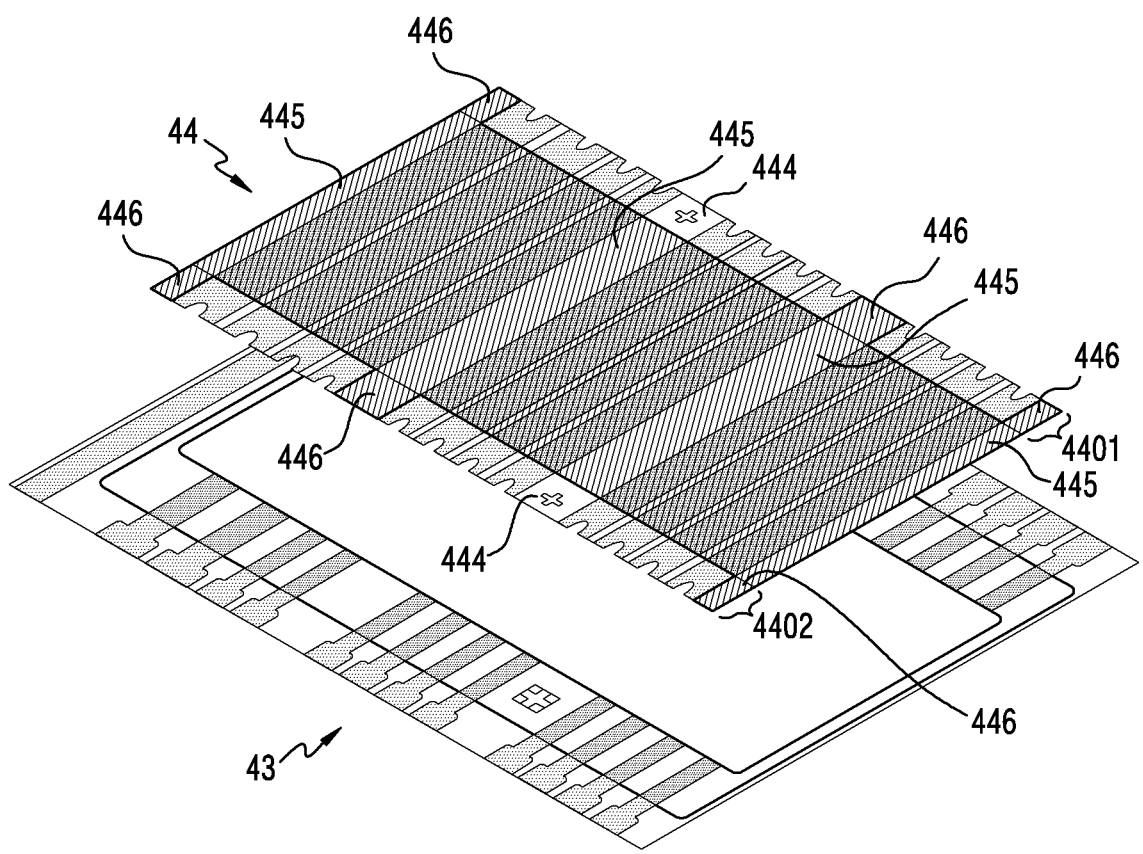
FIGS. 13, 14 and 15 are perspective views each illustrating an example state in which a rigid structure is added to a non-conductive line of the second layer according to various embodiments.

FIG. 13 is a perspective view illustrating an example state in which a rigid structure is added to a non-conductive line of the second layer according to various embodiments.

Referring to FIG. 13, in the second layer 44 according to various embodiments, the protective layer is removed from the second regions 4401 and 4402 bonded to the first layer 43 (see FIG. 9B), but in order to add the rigid structure of the second layer 44, the protective layer on a portion 446 of each second non-conductive line 445 on the second connection regions 4401 and 4402 is maintained without being removed, so that the rigidity of the second layer can be improved. On the second alignment mark 444, the protective layer may be or may not be removed.

Figure 14:
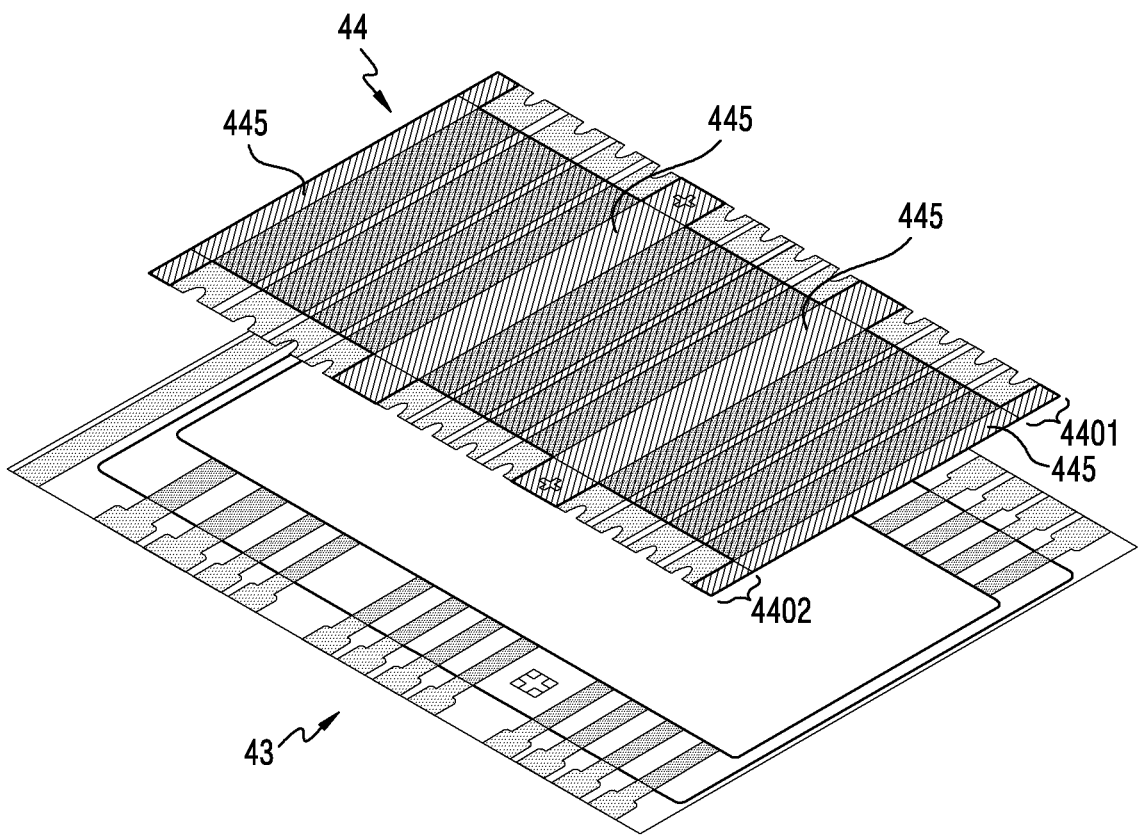

FIG. 14 is a perspective view illustrating an example state in which a rigid structure is added to a non-conductive line of the second layer according to various embodiments.

Referring to FIG. 14, in the second layer 44 according to various embodiments, the protective layer is removed from the second regions 4401 and 4402 bonded to the first layer 43 (see FIG. 9B), but in order to add the rigid structure of the second layer 44, the protective layer on each second non-conductive line 445 on the second connection regions 4401 and 4402 is maintained without being removed, so that the rigidity of the second layer 44 can be improved. On the alignment mark, the protective layer may not be removed.

Figure 15:
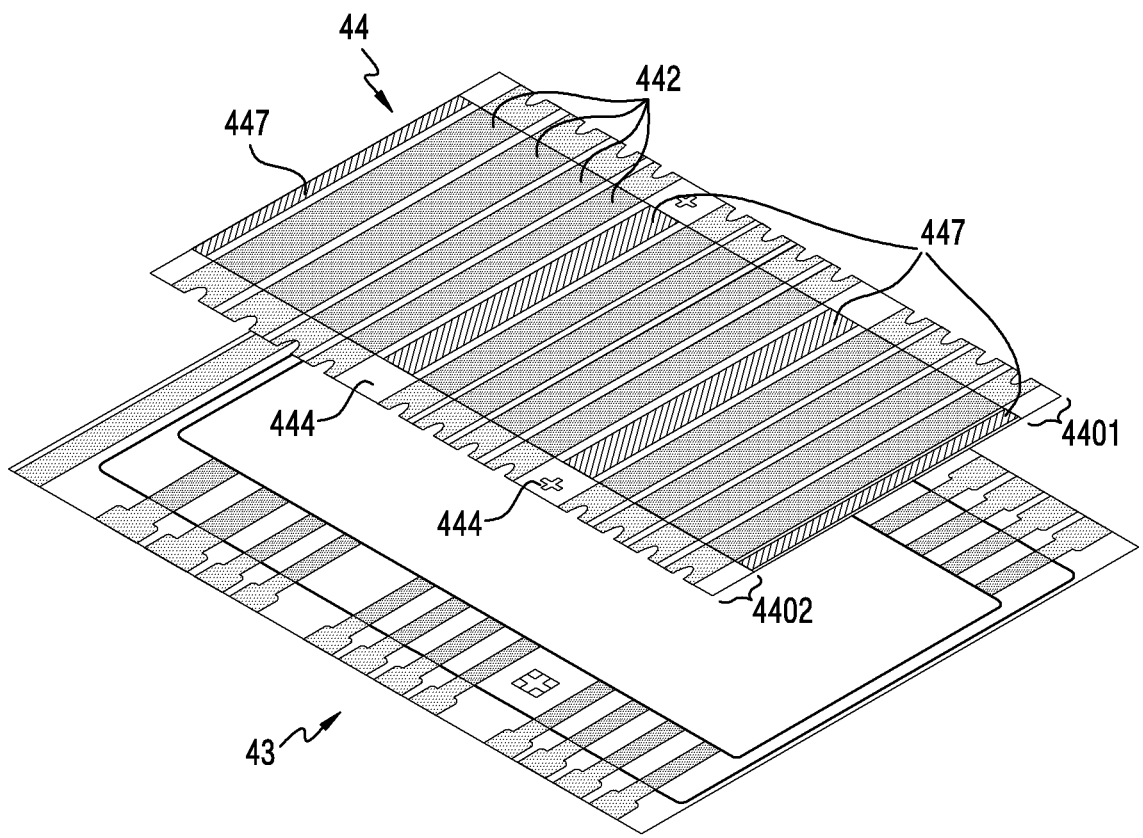

FIG. 15 is a perspective view illustrating an example state in which a dummy pattern is added to a non-conductive line of the second layer according to various embodiments.

Referring to FIG. 15, the second layer 44 according to various embodiments may include dummy patterns 447 additionally formed on second non-conductive lines 445, each of which is formed between adjacent channels, each of which is formed by four conductive lines 442. Each of the dummy patterns 447 may not be formed in the second connection regions 4401 and 4402. The second layer 44 may be improved in rigidity due to the respective dummy patterns 447 added to the second non-conductive lines 445. On the second alignment mark 444, the protective layer may be or may not be removed.

FIGS. 16A, 16B, 16C and 16D are example views each illustrating an example shape of a dummy pattern (e.g., a dummy pattern 447 in FIG. 15) according to various embodiments.

Figure 16A:
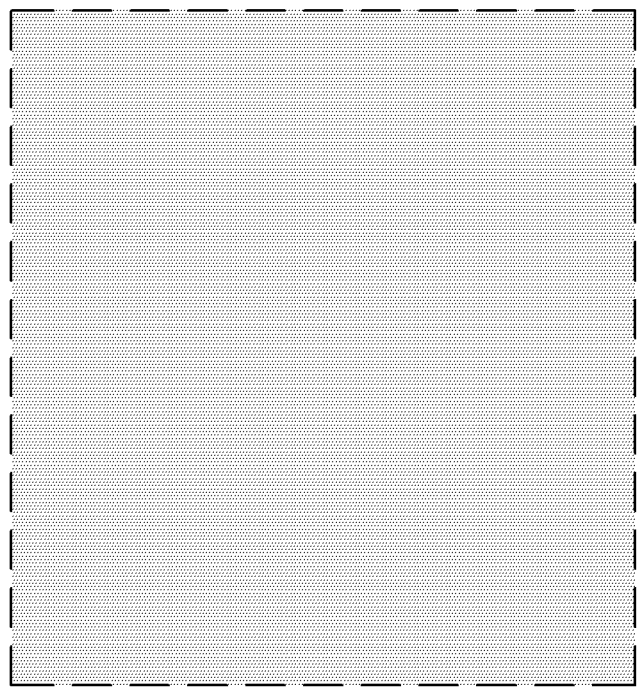
FIGS. 16A, 16B, 16C and 16D are diagrams each illustrating an example shape of a dummy pattern according to various embodiments.

Referring to FIG. 16A, the dummy pattern 447 according to various embodiments may be formed in a solid type in order to improve rigidity in the horizontal and vertical directions.

Figure 16B:
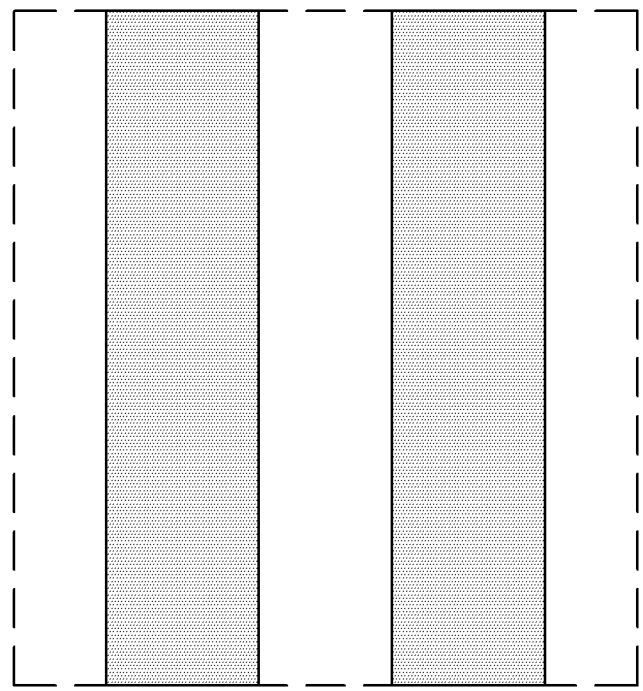

Referring to FIG. 16B, the dummy pattern 448 according to various embodiments may be formed in a horizontally segmented type to be rigid in the vertical direction and elastic in the horizontal direction.

Figure 16C:
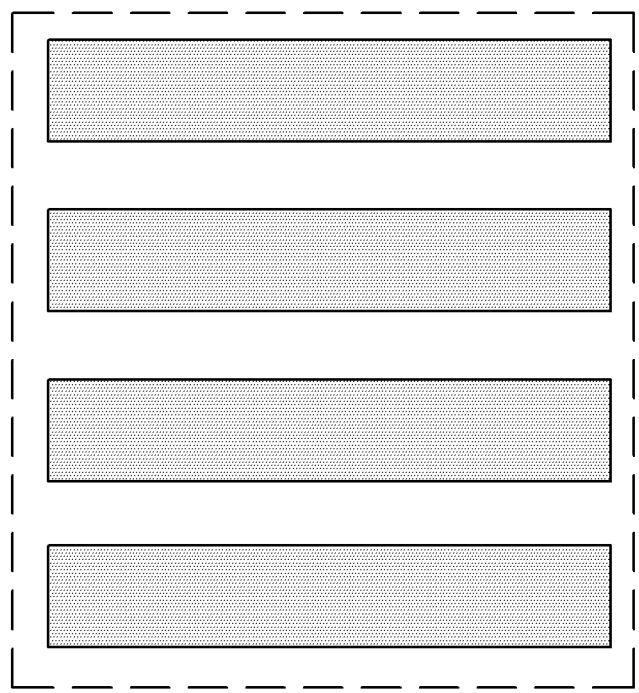

Referring to FIG. 16C, the dummy pattern 449 according to various embodiments may be formed in a vertically segmented type to be elastic in the vertical direction elasticity and rigid in the horizontal direction.

Figure 16D:
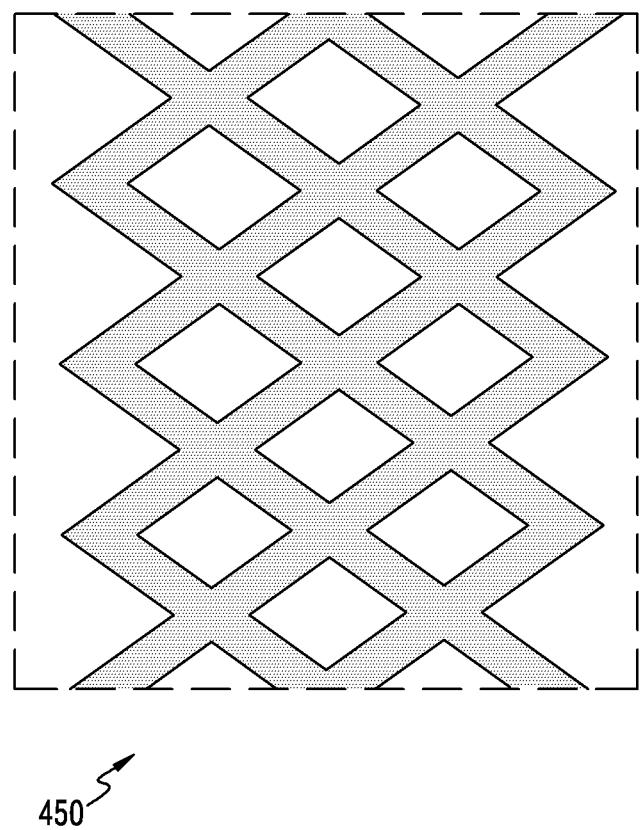

Referring to FIG. 16D, the dummy pattern 450 according to various embodiments may be formed in a mesh type for rigidity and elasticity.

Figure 17A:
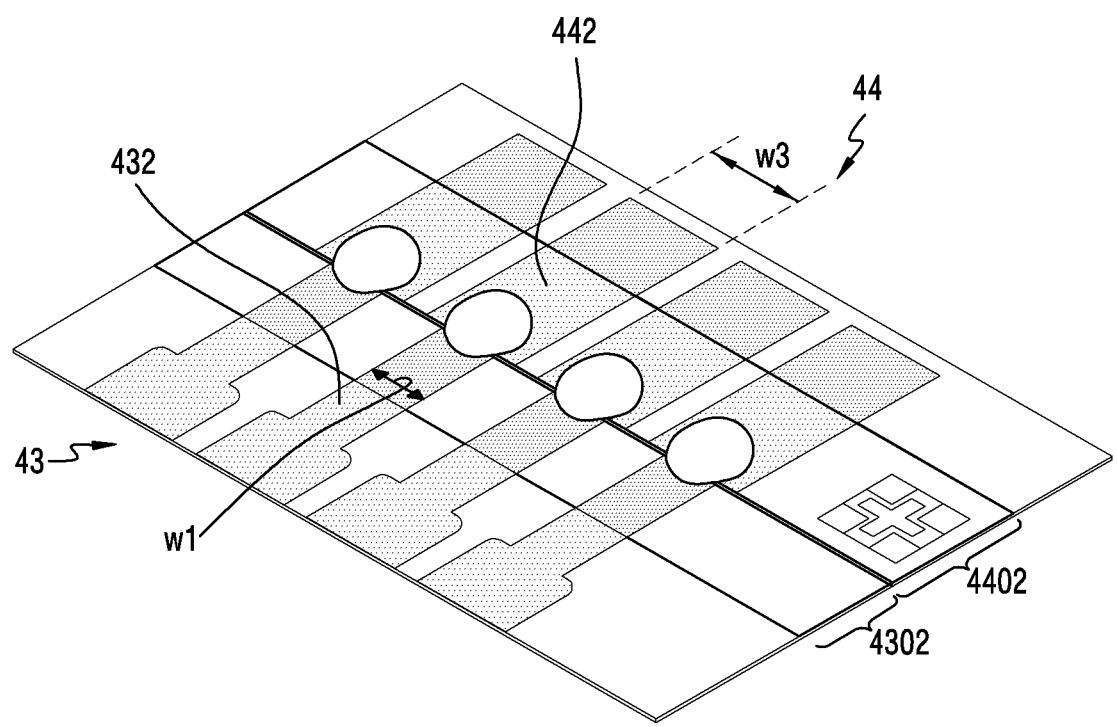
FIG. 17A is a perspective view illustrating a portion an example bonding region of the first and second layers in a state in which a conductive bonding process has been performed, in an enlarged scale according to various embodiments.
Figure 17B:
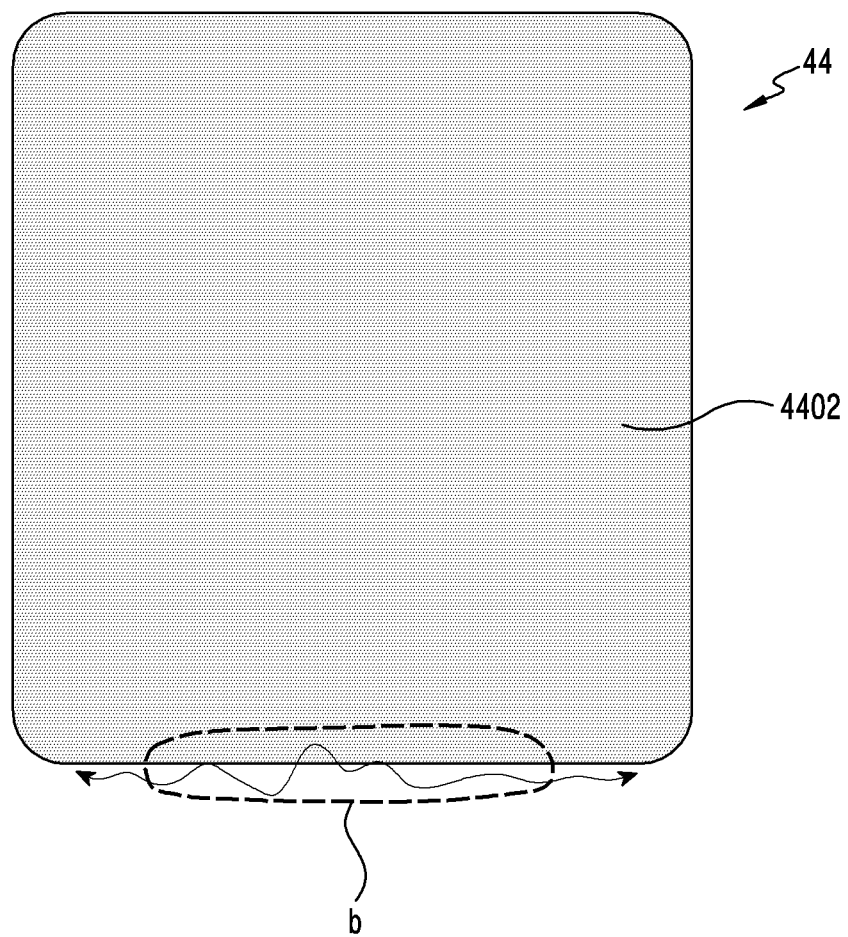
FIG. 17B is a plan view illustrating a portion of an example bonding region of the second layer in an enlarged scale according to various embodiments.

FIG. 17A is a perspective view illustrating a portion an example bonding region of the first and second layers in the state in which a conductive bonding process (e.g., soldering) has been performed, in an enlarged scale, according to various embodiments. FIG. 17B is a plan view illustrating a portion of an example bonding region of the second layer in an enlarged scale according to various embodiments.

Referring to FIGS. 17A and 17B, the connection portions of the first and second layers 43 and 44 (e.g., the first and second layers 43 and 44 in FIG. 4A) can be bonded to each other by a conductive bonding process in the overlapping regions 4302 and 4402. The width w1 of each first conductive line 432 of the first layer 43 is defined to be less than the width w3 of each second conductive line 442 of the second layer 44. Thus, the bonding (contact) region by solder S is reduced, which may result in a short circuit failure with a peripheral pattern due to the flow of the solder s (in the direction indicated by an arrow). A boundary portion b of the second conductive line 442 of the second connection region 4402 of the second layer 44 has a small surface area, and thus the bonding intensity with the first conductive line 432 of the first connection region 4302 of the first layer 43 may deteriorate.

FIGS. 18A, 18B, 18C and 18D are plan views each illustrating a portion of an example connection portion of the second layer (e.g., the second layer 44 in FIG. 4A) in an enlarged scale according to various embodiments.

Figure 18A:
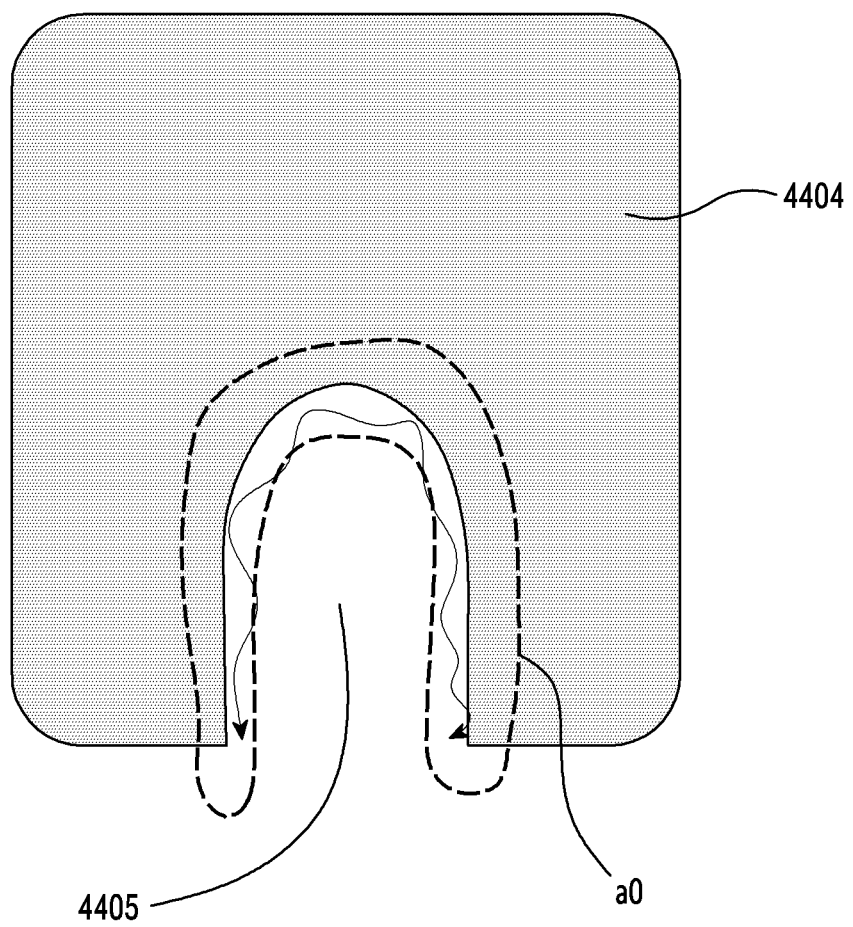
FIGS. 18A, 18B, 18C and 18D are plan views each illustrating a portion of an example connection portion of the second layer in an enlarged scale according to various embodiments.

Referring to FIG. 18A, the second connection portion 4404 of the second layer 44 according to various embodiments may have a recessed opening 4405 having a horseshoe shape in a portion thereof to be bonded to the connection portion of the first layer. The surface area of the second connection portion 4404 is increased by the recessed opening 4405, and the flow of the solder material occurs along the recessed opening 4405 (in the direction indicated by an arrow), thereby preventing and/or reducing short circuit failure with a peripheral pattern. The dotted line may be a soldering region a0.

Figure 18B:
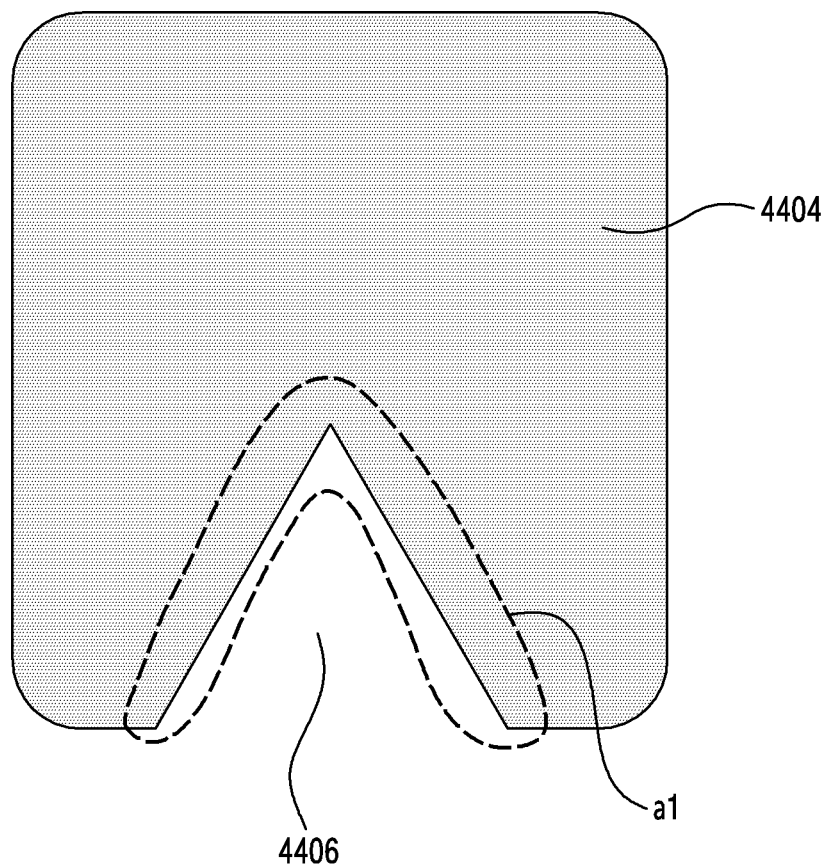

Referring to FIG. 18B, the second connection portion 4404 of the second layer according to various embodiments may have a recessed opening 4406 having a polygonal shape (e.g., a triangular shape) in a portion thereof to be bonded to the connection portion of the first layer. The surface area of the second connection portion 4404 is increased by the recessed opening 4406, and the flow of the solder material occurs along the recessed opening 4406, thereby preventing and/or reducing short circuit failure with a peripheral pattern. The dotted line may be a soldering region a1.

Figure 18C:
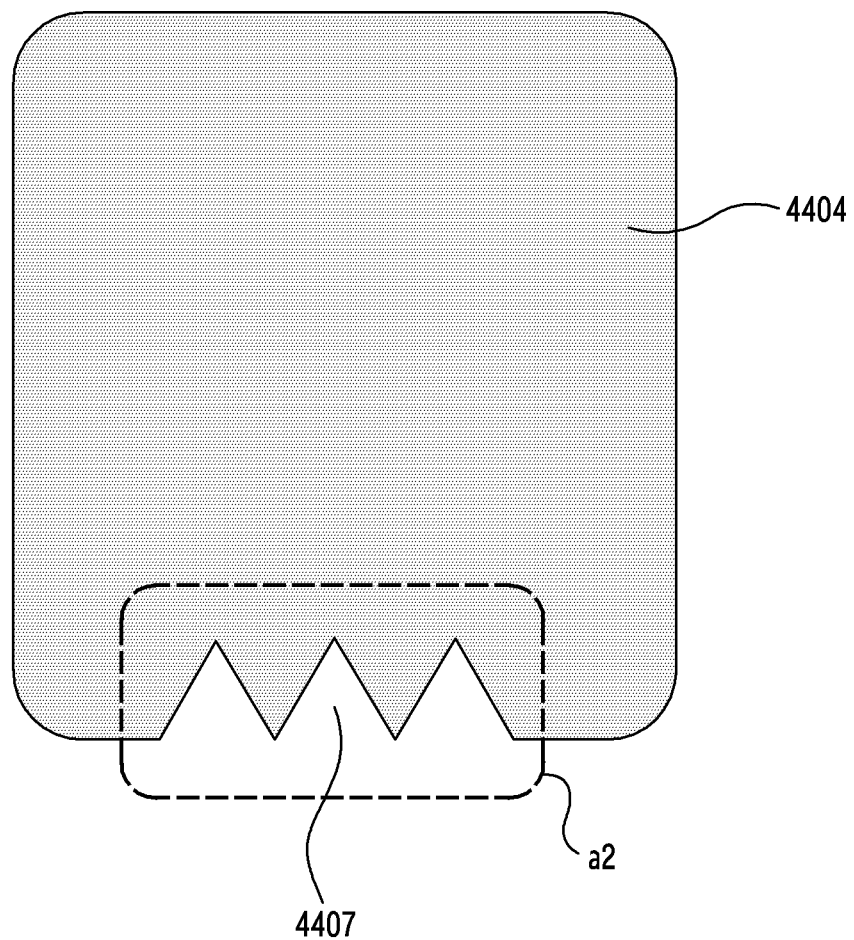

Referring to FIG. 18C, the second connection portion 4404 of the second layer according to various embodiments may have a recessed opening 4407 having a sawtooth shape (e.g., a plurality of polygonal shapes) in a portion thereof to be bonded to the connection portion of the first layer. The surface area of the second connection portion 4404 is increased by the recessed opening 4407, and the flow of the solder material occurs along the recessed opening 4407, thereby preventing and/or reducing short circuit failure with a peripheral pattern. A region indicated by a dotted line a2 may be a soldering region.

Figure 18D:
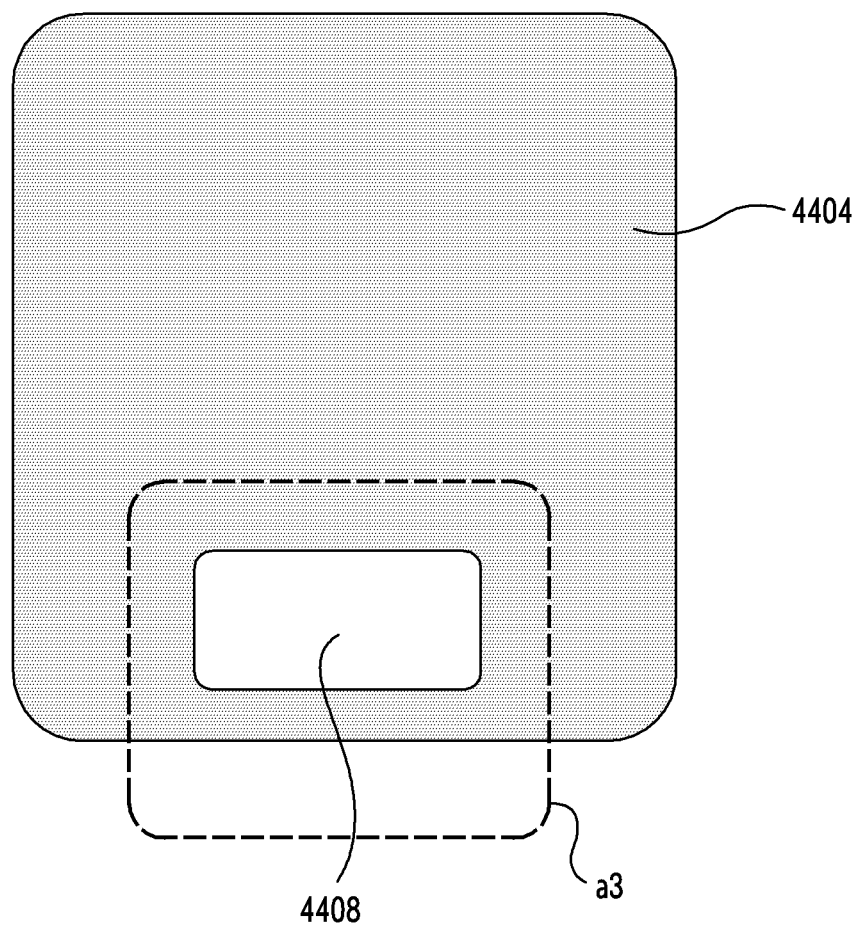

Referring to FIG. 18D, the second connection portion 4404 of the second layer according to various embodiments may have an opening 4408 having a closed curve shape in a portion thereof to be bonded to the connection portion of the first layer. The surface area of the second connection portion 4404 is increased by the opening 4408, and the flow of the solder material occurs along the periphery of the recessed opening 4408, thereby preventing and/or reducing short circuit failure with a peripheral pattern. For example, the opening 4408 may have a polygonal shape or a circular shape. A region indicated by a dotted line a3 may be a soldering region.

FIGS. 18A, 18B, 18C and 18D are simply illustrative non-limiting examples that illustrate various shapes of various types of openings formed in the second connection portion 4404 and soldering regions associated therewith. However, it will the understood that the disclosure is not limited to these specifically illustrated geometries and various other geometries and associated soldering regions may be used without limitation.

Figure 19A:
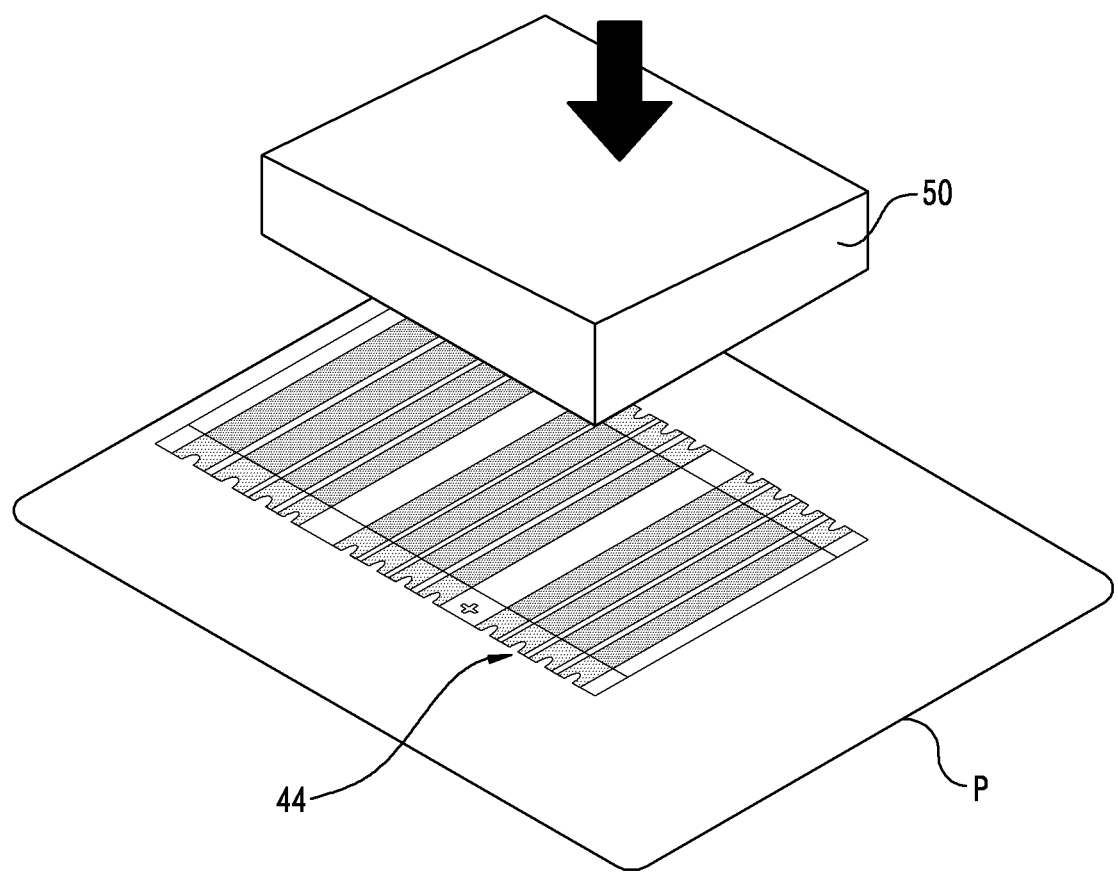
FIG. 19A is a perspective view illustrating an example process of stamping the second layer using a stamping device according to various embodiments.
Figure 19B:
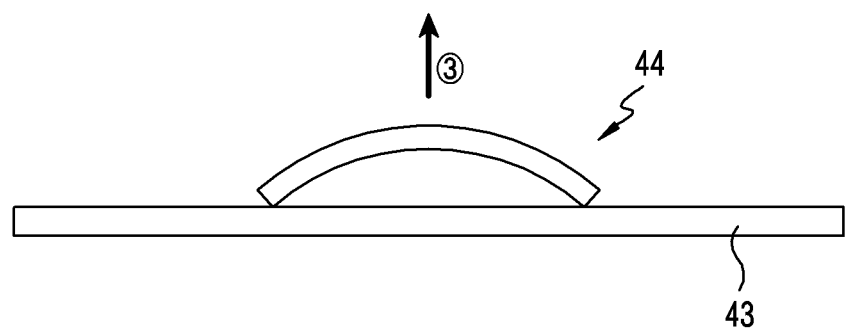
FIG. 19B is a side view illustrating an example state in which the second layer after stamping is placed in order to bond the second layer to the first layer according to various embodiments.

FIG. 19A is a perspective view illustrating an example process of stamping the second layer using a stamping device according to various embodiments. FIG. 19B is a side view illustrating an example state in which the second layer after stamping is placed in order to bond the second layer to the first layer according to various embodiments.

Referring to FIGS. 19A and 19B, the contour of the second layer 44 (e.g., the second layer 44 in FIG. 4A) according to various embodiments may be separated from an original-printed circuit board p through a stamping process. A stamping device 50 may be used in the stamping process.

The contour of the second layer 44 according to various embodiments may be shaped by pressing of a press cutting mold. The pressing for shaping of the contour the second layer 44 may cause a convexly curved phenomenon in the second layer 44. Therefore, a process of bonding the second layer 44 to the first layer 43 may proceed in the state in which the convex portion of the second layer 44 faces upwards (indicated by arrow ③). For example, when the convex portion of the second layer 44 is disposed to face downwards on the first layer 43, a failure in the bonding process of the first and second layers 43 and 44 may occur.

Figure 20A:
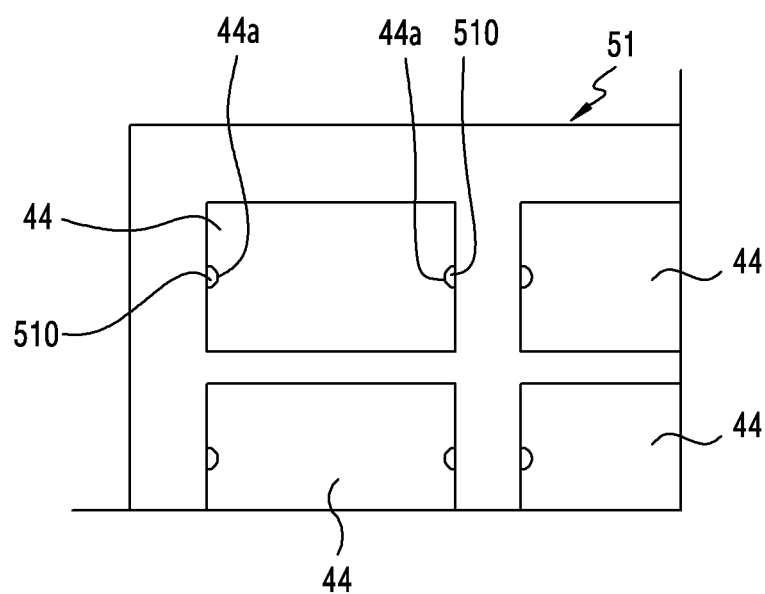
FIGS. 20A and 20B are plan views each illustrating an example state in which each second layer is fixed to a tray according to various embodiments.

FIG. 20A is a plan view illustrating an example state in which second layers (e.g., the second layer 44 in FIG. 4A) are fixed to a tray according to various embodiments.

Referring to FIG. 20A, after being fabricated through a stamping process, it may be necessary to transfer a second layer 44 for a bonding process. A plurality of second layers 44 may be transported in the state of being fixed to the tray 51 by respective fixing devices. The fixing devices may serve to hold the respective second layers 44 not to move from the tray 51. For example, in the fixing devices, respective fixing openings 44a may be formed at both ends of each of the second layers 44, for example, in the regions where non-conductive lines are present, and fixing protrusions 510 may be formed on the tray 51 to be inserted into the respective fixing openings 44a. By inserting the fixing protrusions 510 into the respective fixing openings 44a, each of the second layers 44 can be prevented from and/or may reduce moving during the transportation of the tray 51.

Figure 20B:
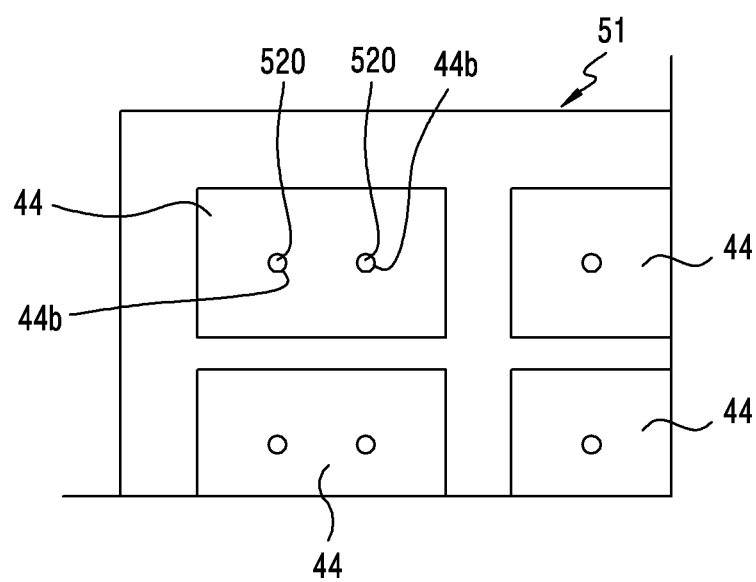

FIG. 20B is a plan view illustrating an example state in which the second layers (e.g., the second layer 44 in FIG. 4A) are fixed to the tray according to various embodiments.

Referring to FIG. 20B, after being fabricated through a stamping process, it may be necessary to transfer a second layer 44 according to various embodiments for a bonding process. A plurality of second layers 44 may be transported in the state of being fixed to the tray 51 by respective fixing devices. The fixing devices may, for example, serve to hold the respective second layers 44 not to move from the tray 51. For example, in the fixing devices, respective fixing openings 44b may be formed on the respective non-conductive lines of the second layers 44, and fixing protrusions 520 may be formed on the tray 51 to be inserted into the respective fixing openings 44b. By inserting the fixing protrusions 520 into the respective fixing openings 44b, each of the second layers 44 can be prevented from and/or may reduce moving during the transportation of the tray 51.

An electronic device 100 according to various example embodiments may include: a housing 110 including a first plate 102 facing a first direction and a second plate 111 facing a direction opposite the first direction; a display layer 41 disposed between the first and second plates 102 and 111; and a touch detection layer 42 disposed between the display layer 41 and the second plate 111, wherein the touch detection layer 42 may include: a first layer 43 including a first face 43a facing the display layer 41, a second face 43b oriented in a direction away from the first face 43a, and an opening 430; a second layer 44 disposed between the opening 430 and the second plate, electrically connected to the first layer 43, and coupled to the first layer 43; and a fingerprint sensor 45 disposed in the opening 430 and disposed between the first layer 43 and the second layer 44.

The first layer 43 according to various example embodiments may include a plurality of first conductive lines 432, and the second layer 44 may include a plurality of second conductive lines 442 electrically connected to a subset of the plurality of first conductive lines 432.

The plurality of second conductive lines 442 according to various example embodiments may be electrically connected to the subset of the plurality of first conductive lines 432 through solder S.

The subset of the plurality of first conductive lines 432 according to various example embodiments may include first connection portions 4304 having a first width w1, and the plurality of second conductive lines 442 include a second connection portions 4404 having a second width w3 lager than the first width w1.

The solder S according to various example embodiments may be disposed between the first and second connection portions 4304 and 4404.

Each of the second connection portions 4404 may further include a solder opening 4405, 4406, 4407, or 4408 configured to enlarge a contact area with the solder.

The second layer 44 according to various example embodiments may be attached to the second face 43b of the first layer 43.

The fingerprint sensor 45 according to various example embodiments may include an ultrasonic fingerprint sensor.

When the second layer 44 according to various example embodiments is bonded to the first layer 43, a region around a first face 44a of the second layer 44 may be bonded to a region around the opening 430 in the second face 43b of the first layer 43 and may include a slit 431 disposed between the first layer 43 and the second layer 44 configured to allow a flexible circuit 451 of the fingerprint sensor 45 to be drawn out therethrough.

The first layer 43 according to various example embodiments may include a base layer 4311, a first wiring layer 4312 formed on the first face of the first base layer 4311, a second wiring layer 4313 formed on the second face of the first base layer 4311, a first protective layer 4314 formed on a first face of the first wiring layer 4312, and a second protective layer 4315 formed on a second face of the second wiring layer 4313.

The second layer 44 according to various example embodiments may include a third wiring layer 4411, a third protective layer 4412 formed on a first face of the third wiring layer 4411, and a fourth protective layer 4413 formed on a second face of the third wiring layer 4411.

At least a portion of the first wiring layer 4314 may be electrically connected to the third wiring layer 4411 by removing at least a portion of the first protective layer 4314 and removing a portion of the fourth protective layer 4413.

At least a portion of the second wiring layer 4313 may be electrically connected to the third wiring layer 4411 by removing at least a portion of the first protective layer 4314, the first wiring layer 4312, and the first base layer 4311, and removing a portion of the fourth protective layer 4413.

The second layer 44 according to various example embodiments may further include a rigid structure.

The rigid structure according to various example embodiments may be formed as a structure in which a first conductive layer 4314 is not removed on a second non-conductive line 445 between each adjacent second conductive lines 442.

The rigid structure according to various example embodiments may include a dummy pattern 447, which is further formed on a second non-conductive line 445 disposed between each adjacent second conductive lines 442.

According to various example embodiments, first and second magnetic force shield layers 460 and 462 may be additionally formed on at least a portion of the second face 43*b* of the first layer 43 and at least a portion of the second face 44*b* of the second layer 44, respectively, and first and second heat dissipation layers 470 and 472 may be additionally formed on at least a portion of the second face of the first magnetic force shield layer 460 and at least a portion of a second face of the second magnetic force shield layer 462, respectively.

An electronic device 100 according to various example embodiments may include: a first digitizer 43 including a plurality of first conductive lines 432 and an opening 430 formed by removing at least a portion of the plurality of first conductive lines 432; a second digitizer 44 including a plurality of second conductive lines 442 and covering at least a portion of the opening 430, the second digitizer 44 disposed to overlap at least a portion of the first digitizer 43 and bonded to at least a portion of the first digitizer 43, and the second digitizer 44 being configured to electrically connect respective first conductive lines 432 spaced apart from each other by the opening 430; and a fingerprint sensor 45 disposed in the opening 430 and located between the first and second digitizers 43 and 44.

According to various example embodiments, the width w1 of each of the first conductive lines 432 and the width w3 of each of the second conductive lines 442 are different from each other.

According to various example embodiments, a second non-conductive line 445 may be located between each adjacent second conductive lines 442, and a rigid dummy pattern 447 may be additionally formed on at least one of the second non-conductive lines 445.

The various example embodiments disclosed herein and illustrated in the drawings are provided by way of illustration and are not intended to limit the scope of the present disclosure. Therefore, all changes or modifications derived from the technical idea of the present disclosure as well as the embodiments described herein should be understood to fall within the scope of the present disclosure.

What is claimed is:

1. An electronic device comprising:
    a housing including a first plate facing a first direction and a second plate facing a direction opposite the first direction;
    a display layer disposed between the first and second plates; and
    a touch detection layer disposed between the display layer and the second plate,
    wherein the touch detection layer includes:
    a first layer including a first face facing the display layer, a second face facing a direction away from the first face, and an opening;
    a second layer disposed between the opening and the second plate, electrically connected to the first layer and being coupled to the first layer; and
    a fingerprint sensor disposed in the opening and between the second layer and the display layer.

2. The electronic device of claim 1, wherein the first layer includes a plurality of first conductive lines, and the second layer includes a plurality of second conductive lines electrically connected to a subset of the plurality of first conductive lines.

3. The electronic device of claim 2, wherein the plurality of second conductive lines are electrically connected to the subset of the plurality of first conductive lines by solder.

4. The electronic device of claim 3, wherein the subset of the plurality of first conductive lines includes first connection portions having a first width, and the plurality of second conductive lines include second connection portions having a second width, the second width being greater than the first width.

5. The electronic device of claim 4, wherein the solder is disposed between the first connection portions and the second connection portions.

6. The electronic device of claim 5, wherein each of the second connection portions further includes a solder opening configured to enlarge a contact area with the solder.

7. The electronic device of claim 1, wherein the second layer is attached to the second face of the first layer.

8. The electronic device of claim 1, wherein the fingerprint sensor includes an ultrasonic fingerprint sensor.

9. The electronic device of claim 1, wherein, when the second layer is bonded to the first layer, a region around a first face of the second layer is bonded to a region around the opening in the second face of the first layer and includes a slit disposed between the first layer and the second layer configured to allow a flexible circuit of the fingerprint sensor to be drawn therethrough.

10. The electronic device of claim 1, wherein the first layer includes:
    a first base layer;
    a first wiring layer disposed on a first face of the first base layer;
    a second wiring layer disposed on a second face of the first base layer;
    a first protective layer disposed on a first face of the first wiring layer; and
    a second protective layer disposed on a second face of the second wiring layer.

11. The electronic device of claim 10, wherein the second layer includes:
    a third wiring layer;
    a third protective layer disposed on a first face of the third wiring layer; and
    a fourth protective layer disposed on a second face of the third wiring layer.

12. The electronic device of claim 11, wherein at least a portion of the first wiring layer is electrically connected to the third wiring layer.

13. The electronic device of claim 11, wherein at least a portion of the second wiring layer is electrically connected to the third wiring layer.

14. The electronic device of claim 12, wherein the second layer further includes a rigid structure.

15. The electronic device of claim 14, wherein the rigid structure is a structure including the first protective layer on a second non-conductive line located between each adjacent second conductive lines.

16. The electronic device of claim 14, wherein the rigid structure includes a rigid dummy pattern disposed on a second non-conductive line located between each adjacent second conductive lines.

17. The electronic device of claim 1, wherein first and second magnetic force shield layers are additionally included on at least a portion of the second face of the first layer and on at least a portion of the second face of the second layer, respectively, and first and second heat dissipation layers are included on at least a portion of the second face of the first magnetic force shield layer and on at least a portion of a second face of the second magnetic force shield layer, respectively.

18. An electronic device comprising:

a first digitizer including a plurality of first conductive lines and an opening;

a second digitizer including a plurality of second conductive lines and covering at least a portion of the opening, the second digitizer being disposed to overlap at least a portion of the first digitizer and being bonded to at least a portion of the first digitizer, the second digitizer being configured to electrically connect respective first conductive lines spaced apart from each other by the opening; and a fingerprint sensor disposed in the opening.

19. The electronic device of claim 18, wherein a width of each of the first conductive lines and a width of each of the second conductive lines are different from each other.

20. The electronic device of claim 18, wherein a second non-conductive line is located between each adjacent second conductive lines, and a rigid dummy pattern is disposed on at least one of the second non-conductive lines.

* * * * *